(12) United States Patent
Isoda et al.

(10) Patent No.: US 9,541,147 B2
(45) Date of Patent: Jan. 10, 2017

(54) CLUTCH UNIT

(71) Applicants: Kouji Isoda, Shizuoka (JP); Takahide Saito, Shizuoka (JP); Masahiro Kawai, Shizuoka (JP); Yasumasa Hibi, Shizuoka (JP); Yumiko Mineno, Shizuoka (JP)

(72) Inventors: Kouji Isoda, Shizuoka (JP); Takahide Saito, Shizuoka (JP); Masahiro Kawai, Shizuoka (JP); Yasumasa Hibi, Shizuoka (JP); Yumiko Mineno, Shizuoka (JP)

(73) Assignee: NTN CORPORATION, Osaka (JP)

( * ) Notice: Subject to any disclaimer, the term of this patent is extended or adjusted under 35 U.S.C. 154(b) by 125 days.

(21) Appl. No.: 14/391,184

(22) PCT Filed: Mar. 29, 2013

(86) PCT No.: PCT/JP2013/059641
§ 371 (c)(1),
(2) Date: Oct. 8, 2014

(87) PCT Pub. No.: WO2013/157375
PCT Pub. Date: Oct. 24, 2013

(65) Prior Publication Data
US 2015/0096859 A1  Apr. 9, 2015

(30) Foreign Application Priority Data

Apr. 20, 2012 (JP) .............................. 2012-096612
Dec. 20, 2012 (JP) .............................. 2012-277874

(51) Int. Cl.
*B60N 2/16* (2006.01)
*F16D 67/02* (2006.01)
(Continued)

(52) U.S. Cl.
CPC ............... *F16D 67/02* (2013.01); *B60N 2/165* (2013.01); *B60N 2/167* (2013.01); *B60N 2/168* (2013.01);
(Continued)

(58) Field of Classification Search
CPC ......... B60N 2/167; B60N 2/168; F16D 67/02; F16D 41/105; F16D 41/18
(Continued)

(56) References Cited

U.S. PATENT DOCUMENTS

| 6,481,557 | B2 * | 11/2002 | Denis | ..................... B60N 2/167 192/15 |
| 2009/0184554 | A1 * | 7/2009 | Paing | ..................... B60N 2/167 297/358 |
| 2010/0175962 | A1 * | 7/2010 | Kawai | ................... B60N 2/1615 192/16 |

FOREIGN PATENT DOCUMENTS

| JP | 51-26813 | 8/1976 |
| JP | 11-342036 | 12/1999 |

(Continued)

OTHER PUBLICATIONS

International Preliminary Report on Patentability and Written Opinion of the International Searching Authority issued Oct. 21, 2014 in International (PCT) Application No. PCT/JP2013/059641.
(Continued)

*Primary Examiner* — Richard Lorence
(74) *Attorney, Agent, or Firm* — Wenderoth, Lind & Ponack, L.L.P.

(57) ABSTRACT

A clutch unit includes a lever-side clutch section provided on an input side, for controlling rotational torque to be input through lever operation, and a brake-side clutch section provided on an output side, for transmitting the rotational torque from the lever-side clutch section to the output side, and interrupting rotational torque to be reversely input from
(Continued)

the output side. The brake-side clutch section has a two-layer structure, in which two one-way clutches are arranged side by side in an axial direction. The first one-way clutch interrupts rotational torque in a forward direction, which is reversely input from the output side, through meshing of serrated projection and depression portions, whereas the second one-way clutch interrupts rotational torque in a backward direction, which is reversely input from the output side, through meshing of serrated projection and depression portions arranged in an opposite direction.

12 Claims, 24 Drawing Sheets

(51) Int. Cl.
 *F16D 41/10* (2006.01)
 *F16D 41/18* (2006.01)
 *B60N 2/18* (2006.01)
(52) U.S. Cl.
 CPC ............ *B60N 2/169* (2013.01); *B60N 2/1814* (2013.01); *B60N 2/1882* (2013.01); *B60N 2/1892* (2013.01); *B60N 2/1896* (2013.01); *F16D 41/105* (2013.01); *F16D 41/18* (2013.01)
(58) Field of Classification Search
 USPC .................................................. 192/223.1, 15
 See application file for complete search history.

(56) References Cited

FOREIGN PATENT DOCUMENTS

| | | |
|---|---|---|
| JP | 2003-320879 | 11/2003 |
| JP | 2012-31913 | 2/2012 |
| JP | 2012-31976 | 2/2012 |

OTHER PUBLICATIONS

International Search Report issued May 7, 2013 in International (PCT) Application No. PCT/JP2013/059641.
Office Action issued Sep. 2, 2016 in corresponding Japanese Application No. 2012-277874, with English translation.

* cited by examiner

CLUTCH UNIT

TECHNICAL FIELD

The present invention relates to a clutch unit comprising a lever-side clutch section to which a rotational torque is to be input through lever operation, and a brake-side clutch section for transmitting the rotational torque from the lever-side clutch section to an output side and interrupting a rotational torque to be reversely input from the output side.

BACKGROUND ART

In general, in a clutch unit using engagement elements such as cylindrical rollers or balls, a clutch section is arranged between an input member and an output member. The clutch section is configured to engage and disengage the engagement elements, such as cylindrical rollers or balls, between the input member and the output member, to thereby control transmission and interruption of a rotational torque.

The applicant of the present invention has previously proposed a clutch unit to be built into, for example, an automobile seat-lifter section for vertically adjusting a seat through lever operation. This clutch unit includes a lever-side clutch section to which a rotational torque is to be input through lever operation, and a brake-side clutch section for transmitting the rotational torque from the lever-side clutch section to an output side and interrupting a rotational torque to be reversely input from the output side (see, for example, Patent Literature 1).

FIG. 32 is a sectional view illustrating an overall structure of the above-mentioned related-art clutch unit disclosed in Patent Literature 1. FIG. 33 illustrates a cross section of the lever-side clutch section taken along the line E-E of FIG. 32. FIG. 34 illustrates a cross section of the brake-side clutch section taken along the line F-F of FIG. 32.

As illustrated in FIGS. 32 and 33, a lever-side clutch section 111 mainly includes a lever-side outer ring 114 to which a rotational torque is to be input through lever operation, an inner ring 115 for transmitting the rotational torque from the lever-side outer ring 114 to a brake-side clutch section 112, a plurality of cylindrical rollers 116 for controlling transmission and interruption of the rotational torque from the lever-side outer ring 114 through engagement and disengagement with respect to wedge gaps 120 formed between the lever-side outer ring 114 and the inner ring 115, a cage 117 for retaining the cylindrical rollers 116 at predetermined circumferential intervals, an inner centering spring 118 for accumulating an elastic force obtained by the rotational torque from the lever-side outer ring 114 and restoring the cage 117 to a neutral state with the accumulated elastic force through releasing of the rotational torque, and an outer centering spring 119 for accumulating an elastic force obtained by the rotational torque from the lever-side outer ring 114 and restoring the lever-side outer ring 114 to a neutral state with the accumulated elastic force through releasing of the rotational torque.

As illustrated in FIGS. 32 and 34, the brake-side clutch section 112 mainly includes the inner ring 115 to which a rotational torque is to be input from the lever-side clutch section 111, a brake-side outer ring 123 restricted in rotation, an output shaft 122 from which the rotational torque is to be output, a plurality of pairs of cylindrical rollers 127 for controlling transmission of the rotational torque from the inner ring 115 and interruption of a rotational torque from the output shaft 122 through engagement and disengagement with respect to wedge gaps 126 formed between the brake-side outer ring 123 and the output shaft 122, and plate springs 128 each having an N-shape in cross section and being inserted between the cylindrical rollers 127 of each pair, for imparting a repulsive force to the cylindrical rollers 127.

In the lever-side clutch section 111 having the above-mentioned structure, when the rotational torque is input to the lever-side outer ring 114, the cylindrical rollers 116 are engaged into the wedge gaps 120 formed between the lever-side outer ring 114 and the inner ring 115, and the inner ring 115 is rotated with the rotational torque transmitted to the inner ring 115 via the cylindrical rollers 116. At this time, elastic forces are accumulated in both the centering springs 118 and 119 along with the rotation of the lever-side outer ring 114 and the cage 117. When the rotational torque is no longer input, the lever-side outer ring 114 and the cage 117 are restored to their neutral states with the elastic forces of both the centering springs 118 and 119, whereas the inner ring 115 is maintained at the given rotational position. Accordingly, the inner ring 115 is rotated in an inching manner through repetitive rotation of the lever-side outer ring 114, in other words, pumping operation of the operation lever.

In the brake-side clutch section 112 having the above-mentioned structure, when the rotational torque is reversely input to the output shaft 122, the cylindrical rollers 127 are engaged into the wedge gaps 126 formed between the output shaft 122 and the brake-side outer ring 123 so that the output shaft 122 is locked with respect to the brake-side outer ring 123. In this manner, the rotational torque reversely input from the output shaft 122 is locked by the brake-side clutch section 112, and thus back-flow of the rotational torque to the lever-side clutch section 111 is interrupted.

In the brake-side clutch section 112, when the rotational torque is input from the lever-side clutch section 111 to the inner ring 115, on the other hand, the inner ring 115 is brought into abutment on the cylindrical rollers 127 and presses the cylindrical rollers 127 against the elastic forces of the plate springs 128. As a result, the cylindrical rollers 127 are disengaged from the wedge gaps 126 formed between the brake-side outer ring 123 and the output shaft 122 so that the output shaft 122 becomes rotatable. When the inner ring 115 is further rotated, the rotational torque is transmitted from the inner ring 115 to the output shaft 122, and the output shaft 122 is rotated.

CITATION LIST

Patent Literature 1: JP 2012-31913 A

SUMMARY OF INVENTION

Technical Problems

By the way, the brake-side clutch section 112 of the related-art clutch unit disclosed in Patent Literature 1 includes the plurality of pairs of cylindrical rollers 127 arranged in the wedge gaps 126 formed between the brake-side outer ring 123 and the output shaft 122 so as to control the rotational torque from the output shaft 122 to be interrupted through the engagement of the cylindrical rollers 127 into the wedge gaps 126. In the roller type brake-side clutch section 112 as described above, when the cylindrical rollers 127 are to be engaged into the wedge gaps 126 formed between the brake-side outer ring 123 and the output shaft 122, the cylindrical rollers 127 may slip on the brake-side outer ring 123 or the output shaft 122.

When the cylindrical rollers 127 slip as described above, it becomes difficult to smoothly and reliably interrupt the rotational torque from the output shaft 122, and therefore difficult to secure the locked state of the output shaft 122. Particularly in a clutch unit to be built into an automobile seat-lifter section, a significant impact load is applied to the brake-side clutch section 112 at the time of collision of the vehicle as compared to the lever-side clutch section 111. In this brake-side clutch section 112 to which the impact load is applied directly, torque capacity for the impact load needs to be increased, but the cylindrical rollers 127 slip inevitably, resulting in a limited increase in torque capacity. In this respect, there is a significant need for improvement.

In view of the above, the present invention has been proposed to achieve the improvement described above, and it is therefore an object thereof to provide a clutch unit capable of smoothly and reliably interrupting a rotational torque from an output shaft, and facilitating increase in torque capacity.

Solution to Problems

According to one embodiment of the present invention, there is provided a clutch unit, comprising: an input-side clutch section provided on an input side, for controlling transmission and interruption of a rotational torque to be input; and an output-side clutch section provided on an output side, for transmitting the rotational torque from the input-side clutch section to the output side, and interrupting a rotational torque to be reversely input from the output side.

As a technical measure to achieve the above-mentioned object, in the clutch unit according to one embodiment of the present invention, the output-side clutch section comprises: an input member to which the rotational torque is to be input; a stationary member restricted in rotation; an output member from which the rotational torque is to be output; an engagement element arranged between the stationary member and the output member, for interrupting the rotational torque from the output member through engagement between the stationary member and the output member, and transmitting the rotational torque from the input member through disengagement between the stationary member and the output member; and control means for engaging, at the time of interrupting the rotational torque, the engagement element between the stationary member and the output member through meshing of projection and depression portions, and disengaging, at the time of transmitting the rotational torque, the engagement element between the stationary member and the output member through unmeshing of the projection and depression portions.

In the present invention, through the meshing of the projection and depression portions between the stationary member and the output member, the engagement element is engaged between the stationary member and the output member at the time of interrupting the rotational torque. Therefore, when the engagement element is to be engaged between the stationary member and the output member, the engagement element does not slip on the stationary member and the output member. Due to such a structure that the engagement element does not slip, it is possible to smoothly and reliably interrupt the rotational torque from the output member, and to therefore secure the locked state of the output member. Further, in a clutch unit to be built into an automobile seat-lifter section, it is possible to facilitate increase in torque capacity for an impact load that may be applied to the output-side clutch section.

In one embodiment of the present invention, it is desired that the control means comprise: an elastic member provided between the engagement element and the output member, for elastically biasing the engagement element in a direction of engaging the engagement element with the stationary member through the meshing of the projection and depression portions; and a cam portion provided between the engagement element and the input member, for shifting, against an elastic force of the elastic member, the engagement element in a direction of disengaging the engagement element from the stationary member through the unmeshing of the projection and depression portions. When the control means comprises the elastic member and the cam portion, the engagement element can easily be engaged with and disengaged from the stationary member through the meshing and unmeshing of the projection and depression portions.

In one embodiment of the present invention, it is desired that the engagement element be engageable and disengageable between the stationary member and the output member by shifting in a radial direction of the clutch unit. When the engagement element is engageable and disengageable between the stationary member and the output member by shifting in the radial direction as described above, the engagement element can easily be engaged with and disengaged from the stationary member through the meshing and unmeshing of the projection and depression portions.

In one embodiment of the present invention, it is desired that the projection and depression portions each have any one shape selected from among an angular shape, a rectangular shape, or a tooth-like shape. When the shape of each of the projection and depression portions is defined as described above, the projection and depression portions can easily be meshed and unmeshed at the time of engagement and disengagement of the engagement element with and from the stationary member.

In one embodiment of the present invention, it is desired that the cam portion have a tapered surface formed on at least one of the engagement element or the input member. When the cam portion has the tapered surface of the engagement element or the input member as described above, the engagement element is easily shifted in the direction of disengaging the engagement element from the stationary member against the elastic force of the elastic member.

Further, in one embodiment of the present invention, the output-side clutch section may further comprise a two-way clutch comprising two types of one-way clutches each configured to transmit a rotational torque in a forward direction and a rotational torque in a backward direction from the input-side clutch section to the output side, only one type of one-way clutch out of the two types of one-way clutches being configured to interrupt any one of the rotational torque in the forward direction and the rotational torque in the backward direction, which are to be reversely input from the output side, through the meshing of the projection and depression portions. With this structure, due to the meshing of the projection and depression portions of the one type of one-way clutch and the meshing of the projection and depression portions of the another type of one-way clutch, when the engagement element is to be engaged between the stationary member and the output member for both the rotational torques in the forward and backward directions, the engagement element does not slip on the stationary member and the output member. As a result, it is possible to smoothly and reliably interrupt the rotational torque from the output member that rotates in the forward and backward directions, and to therefore secure the locked state of the output member.

In one embodiment of the present invention, it is desired that the two-way clutch be structured so that a stationary member of the one type of one-way clutch and a stationary member of another type of one-way clutch are arranged in abutment on each other, that the stationary member of the one type of one-way clutch have an abutment surface with a protrusion and a hole formed therein, that the stationary member of the another type of one-way clutch have an abutment surface with a protrusion and a hole formed therein, that the protrusion of the stationary member of the one type of one-way clutch be fitted into the hole of the stationary member of the another type of one-way clutch under a state in which directions of interrupting the rotational torque through the meshing of the projection and depression portions are opposite to each other, and that the protrusion of the stationary member of the another type of one-way clutch be fitted into the hole of the stationary member of the one type of one-way clutch under the state in which the directions of interrupting the rotational torque through the meshing of the projection and depression portions are opposite to each other. With this structure, as the one type of one-way clutch and the another type of one-way clutch, the two types of one-way clutches having the same structure can be used in combination, and thus the cost of the entire clutch unit can be reduced. Further, the two types of one-way clutches can reliably be assembled into the state in which the directions of interrupting the rotational torque through the meshing of the projection and depression portions are opposite to each other.

In one embodiment of the present invention, it is desired that, when disengaging an engagement element of the one type of one-way clutch from the stationary member thereof, the two-way clutch maintain a non-contact state between an input member and an engagement element of the another type of one-way clutch before an input member of the one type of one-way clutch is brought into contact with the engagement element thereof. With this structure, it is possible to avoid such a situation that the engagement element of the another type of one-way clutch is brought into contact with the input member before the engagement element of the one type of one-way clutch is brought into contact with the input member. Accordingly, it is possible to secure a timing to disengage the engagement element of the one type of one-way clutch from the stationary member.

In one embodiment of the present invention, it is desired that the input member and the output member be each shared by the two types of one-way clutches serving as the two-way clutch, and that the engagement element of the one type of one-way clutch and the engagement element of the another type of one-way clutch be arranged in a reverse relationship with respect to their center lines extending in the radial direction. With this structure, as the one type of one-way clutch and the another type of one-way clutch, the two types of one-way clutches having the same structure can be used in combination, and thus the cost of the entire clutch unit can be reduced.

In one embodiment of the present invention, it is desired that the elastic member be shared by the one type of one-way clutch and the another type of one-way clutch out of the two types of one-way clutches serving as the two-way clutch. With this structure, the elastic member can be shared by the two types of one-way clutches. As a result, the number of components can be reduced and the assembling workability can be enhanced, thus facilitating the reduction in cost of the entire clutch unit.

In one embodiment of the present invention, it is desired that the two-way clutch comprise chamfers formed at any one pair of edge portions of the engagement element of the one type of one-way clutch and the engagement element of the another type of one-way clutch, which are arranged side by side in an axial direction of the clutch unit and held in abutment on the stationary member of the one type of one-way clutch and the stationary member of the another type of one-way clutch, respectively, or edge portions of the stationary member of the one type of one-way clutch and the stationary member of the another type of one-way clutch, which are held in abutment on the engagement element of the one type of one-way clutch and the engagement element of the another type of one-way clutch, respectively. With this structure, even when the engagement element of any one type of one-way clutch out of the two types of one-way clutches arranged side by side in the axial direction is moved by an amount corresponding to a tolerance in the axial direction, interference with the stationary member or the engagement element of the another type of one-way clutch can be suppressed, and hence the two types of one-way clutches can be operated smoothly.

Advantageous Effects of Invention

According to one embodiment of the present invention, through the meshing of the projection and depression portions between the stationary member and the output member, the engagement element is engaged between the stationary member and the output member at the time of interrupting the rotational torque. Therefore, when the engagement element is to be engaged between the stationary member and the output member, the engagement element does not slip on the stationary member and the output member. Due to such a structure that the engagement element does not slip, it is possible to smoothly and reliably interrupt the rotational torque from the output member, and to therefore secure the locked state of the output member. Further, in the clutch unit to be built into the automobile seat-lifter section, it is possible to facilitate the increase in torque capacity for the impact load that may be applied to the output-side clutch section. As a result, it is possible to provide a clutch unit capable of enhancing the operability of the output-side clutch section with high performance and reliability.

DESCRIPTION OF EMBODIMENTS

A clutch unit according to the present invention is described below in detail with reference to FIGS. 1 to 31.

Figure 1:
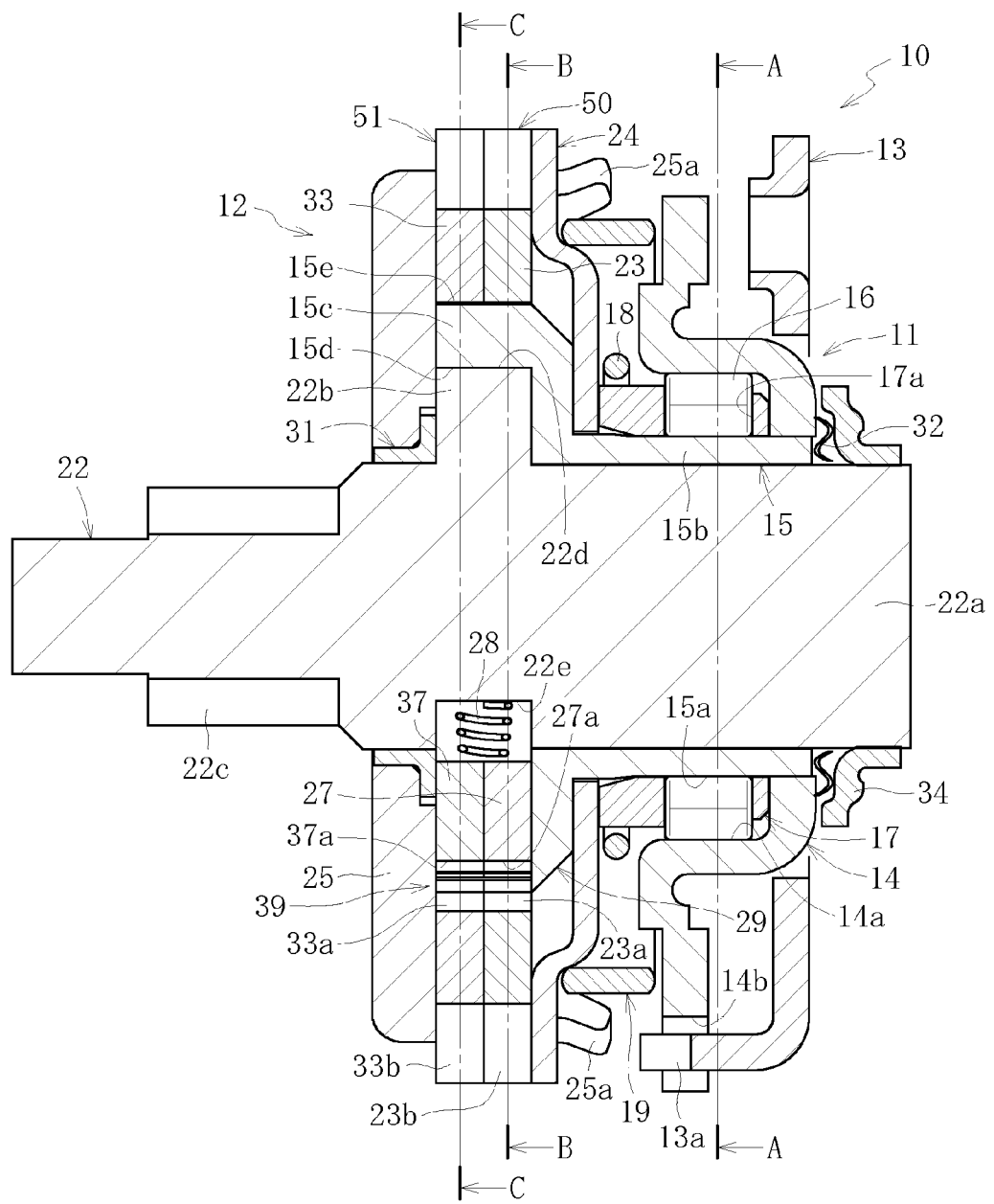
FIG. 1 is a sectional view illustrating an overall structure of a clutch unit according to an embodiment of the present invention.

A clutch unit 10 is built into, for example, an automobile seat-lifter section (see FIGS. 29 to 31) for adjusting a height of a seat through lever operation. As illustrated in FIG. 1, the clutch unit 10 comprises a unit of a lever-side clutch section 11 serving as an input-side clutch section provided on an input side, and a brake-side clutch section 12 serving as an output-side clutch section provided on an output side. The lever-side clutch section 11 has a function of controlling transmission and interruption of rotational torques in both forward and backward directions, which are to be input through the above-mentioned lever operation. The brake-side clutch section 12 has a reverse input interrupting function of transmitting the rotational torques from the lever-side clutch section 11 to the output side and interrupting rotational torques in both the forward and backward directions, which are to be reversely input from the output side.

Figure 2:
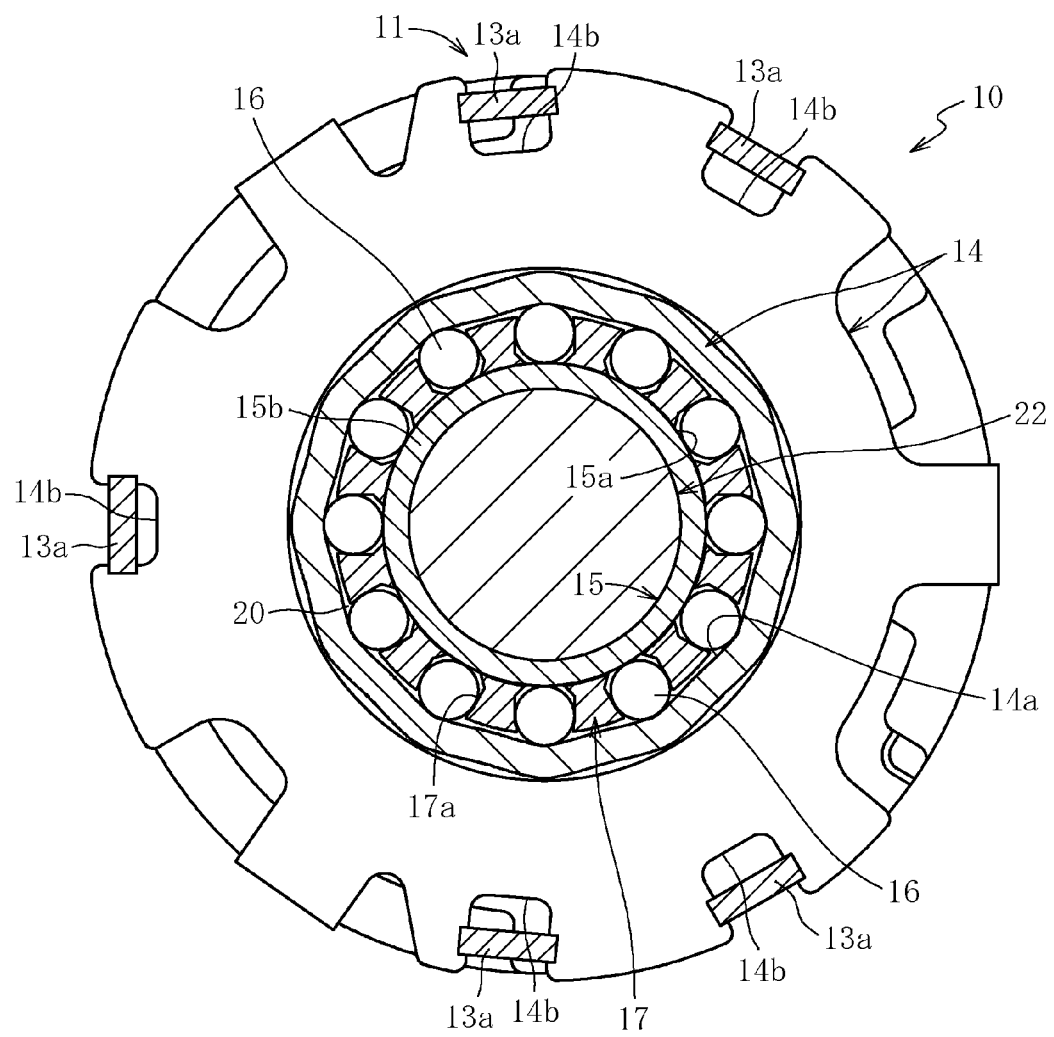
FIG. 2 is a sectional view taken along the line A-A of FIG. 1.

As illustrated in FIGS. 1 and 2, the lever-side clutch section 11 comprises a lever-side side plate 13 and a lever-side outer ring 14, to which an operation lever 41a (see FIG. 29) is fixed, an inner ring 15 for transmitting the rotational torque to be input from the lever-side side plate 13 and the lever-side outer ring 14 to the brake-side clutch section 12, cylindrical rollers 16 arranged in wedge gaps 20 formed between an outer peripheral surface 15a of the inner ring 15 and an inner peripheral surface 14a of the lever-side outer ring 14, respectively, a cage 17 for retaining the plurality of cylindrical rollers 16 equiangularly, an inner centering spring 18 for restoring the cage 17 to a neutral state, and an outer centering spring 19 for restoring the lever-side outer ring 14 to a neutral state.

In the lever-side clutch section 11, claw portions 13a formed on an outer peripheral edge portion of the lever-side side plate 13 are inserted and caulked into cutout depression portions 14b formed in an outer peripheral edge portion of the lever-side outer ring 14 so that the lever-side side plate 13 is fixed to the lever-side outer ring 14 and integrated as an input member of the lever-side clutch section 11. On an inner periphery of the lever-side outer ring 14, a plurality of cam surfaces 14a are formed equiangularly. The inner ring 15 comprises a cylindrical portion 15b into which an output shaft 22 is inserted, and columnar portions 15c formed by extending the cylindrical portion 15b radially outward and partially projecting the extended cylindrical portion 15b in an axial direction. The wedge gaps 20 are formed between an outer peripheral surface of the cylindrical portion 15b of the inner ring 15 and the above-mentioned cam surfaces 14a of the lever-side outer ring 14, and the cylindrical rollers 16 are arranged in the wedge gaps 20, respectively. The cage 17 has such a cylindrical shape that a plurality of pockets 17a for accommodating the cylindrical rollers 16 are formed equiangularly. Note that, detachment of the components is prevented by press-fitting a washer 34 onto an end portion of the output shaft 22 through intermediation of a wave washer 32.

The inner centering spring 18 is a C-shaped member arranged between the cage 17 and a cover 24 serving as a stationary member of the brake-side clutch section 12. At the time of applying the rotational torque input from the lever-side outer ring 14, the inner centering spring 18 is pressed and extended along with rotation of the cage 17 that follows the lever-side outer ring 14 so as to accumulate an elastic force. At the time of releasing the rotational torque input from the lever-side outer ring 14, the inner centering spring 18 restores the cage 17 to the neutral state with an elastic restoring force thereof. Further, the outer centering spring 19 is a C-shaped band plate member arranged between the lever-side outer ring 14 of the lever-side clutch section 11 and the above-mentioned cover 24, and is positioned on a radially outer side of the inner centering spring 18. At the time of applying the rotational torque input from the lever-side outer ring 14, the outer centering spring 19 is pressed and extended along with rotation of the lever-side outer ring 14 so as to accumulate an elastic force. At the time of releasing the rotational torque input from the lever-side outer ring 14, the outer centering spring 19 restores the lever-side outer ring 14 to the neutral state with an elastic restoring force thereof.

Figure 3:
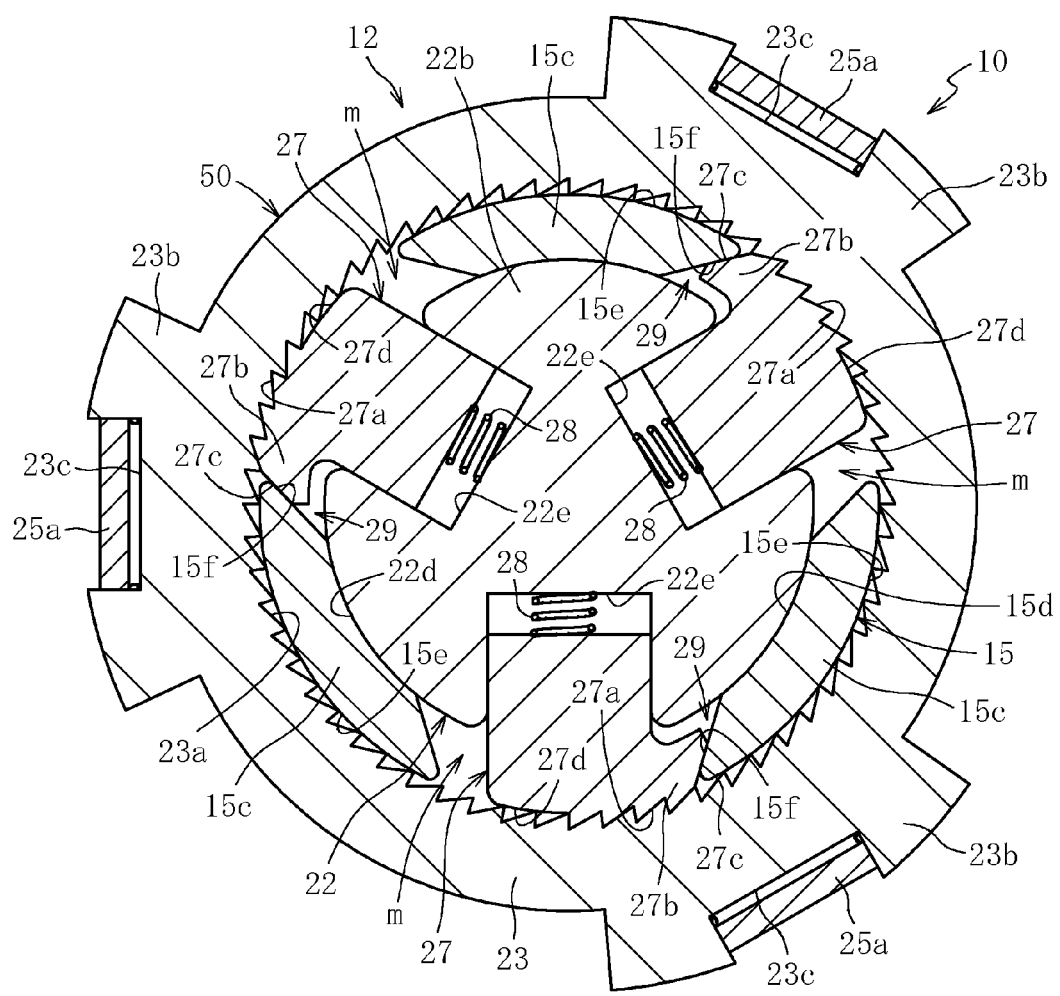
FIG. 3 is a sectional view taken along the line B-B of FIG. 1.
Figure 4:
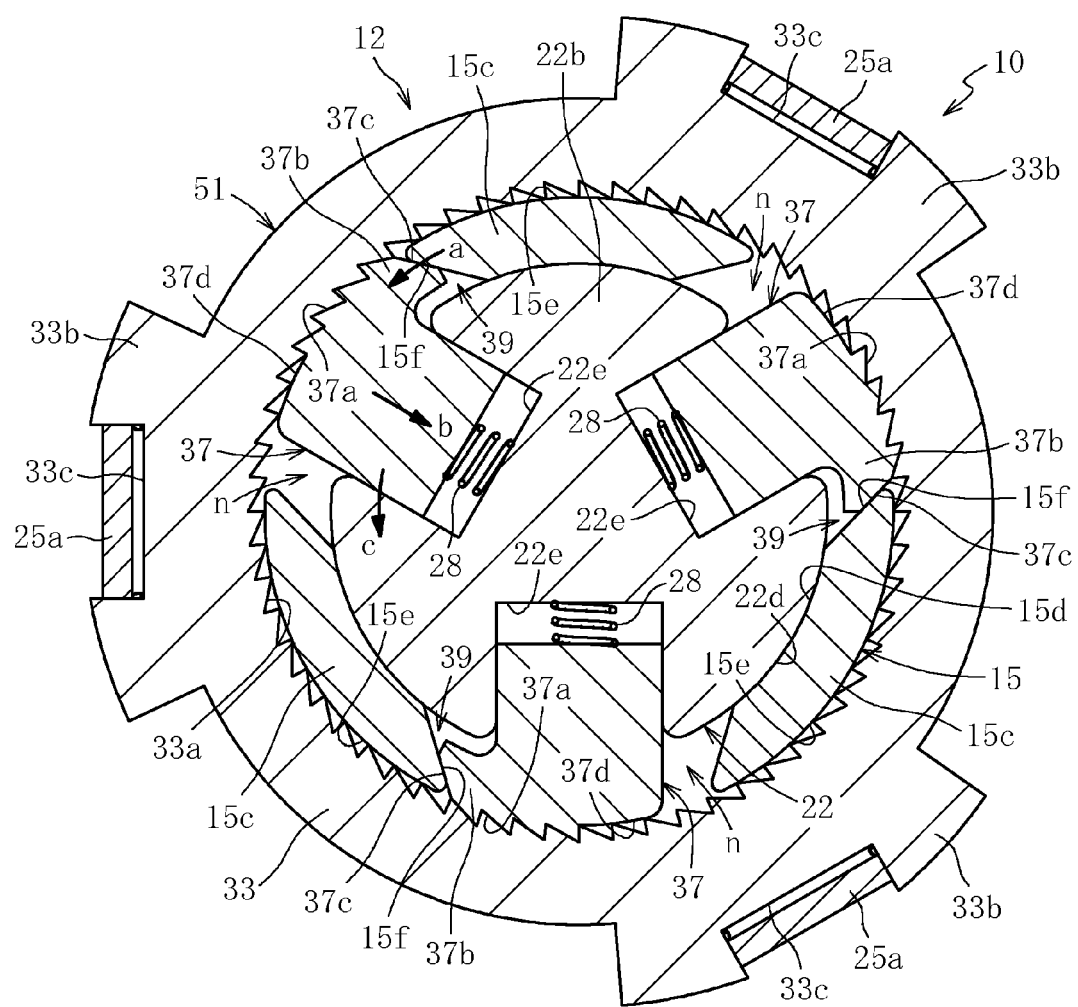
FIG. 4 is a sectional view taken along the line C-C of FIG. 1.

As illustrated in FIGS. 1, 3, and 4, the so-called lock type brake-side clutch section 12 having the reverse input interrupting function serves as a two-way clutch having a two-layer structure, in which two types of (in this embodiment, two) one-way clutches 50 and 51 are arranged side by side in the axial direction. Note that, each of the two one-way clutches 50 and 51 may be formed of a plurality of one-way clutches. The one-way clutches 50 and 51 mainly comprise the inner ring 15 serving as an input member to which the rotational torque is to be input from the lever-side clutch section 11, the output shaft 22 serving as an output member, brake-side outer rings 23 and 33, the cover 24, and a brake-side side plate 25 serving as stationary members restricted in rotation, a plurality of (in FIGS. 3 and 4, three) engagement elements 27 and 37 arranged between the brake-side outer rings 23 and 33 and the output shaft 22, for interrupting the rotational torque to be reversely input from the output shaft 22 through engagement between the brake-side outer rings 23 and 33 and the output shaft 22, and transmitting the rotational torque to be input from the inner ring 15 through disengagement between the brake-side outer rings 23 and 33 and the output shaft 22, and control means for engaging, at the time of interrupting the rotational torque, the engagement elements 27 and 37 between the brake-side outer rings 23 and 33 and the output shaft 22 through meshing of projection and depression portions 23a and 27a and meshing of projection and depression portions 33a and 37a, and disengaging, at the time of transmitting the rotational torque, the engagement elements 27 and 37 between the brake-side outer rings 23 and 33 and the output shaft 22 through unmeshing of the projection and depression portions 23a and 27a and unmeshing of the projection and depression portions 33a and 37a.

Note that, in the brake-side clutch section 12, the inner ring 15, the output shaft 22, the brake-side side plate 25, the cover 24, and coil springs 28 (described later) of the control means are each shared by the two one-way clutches 50 and 51, whereas the remaining brake-side outer rings 23 and 33, engagement elements 27 and 37, and cam portions 29 and 39 (described later) serving as the control means are each formed of different members between the two one-way clutches 50 and 51.

As described above, in the lever-side clutch section 11, the inner ring 15 is configured to exert the function of transmitting the rotational torque to be input from the lever-side side plate 13 and the lever-side outer ring 14 to the brake-side clutch section 12. The inner ring 15 comprises the cylindrical portion 15b into which the output shaft 22 is inserted, and the columnar portions 15c formed by extending the cylindrical portion 15b radially outward and partially projecting the extended cylindrical portion 15b in the axial direction. In the brake-side clutch section 12, the inner ring 15 comprises the plurality of (in FIGS. 3 and 4, three) columnar portions 15c arranged equiangularly, and those columnar portions 15c function as the input member.

In the output shaft 22, a large diameter portion 22b, which is increased in diameter by extending radially outward from a shaft portion 22a having the cylindrical portion 15b of the inner ring 15 inserted externally thereon, is integrally formed substantially in an axial center region of the output shaft 22. A pinion gear 22c to be coupled to a seat-lifter section 41 (see FIG. 29) extends in the axial direction from the large diameter portion 22b and is formed coaxially with the large diameter portion 22b. Circular-arc inner peripheral surfaces 15d of the above-mentioned columnar portions 15c of the inner ring 15 are held in slidable contact with a circular-arc outer peripheral surface 22d of the large diameter portion 22b of the output shaft 22. Note that, a friction ring 31 made of resin is firmly fixed to the brake-side side plate 25, and the friction ring 31 is press-fitted to the output shaft 22 with a predetermined interference. Due to a frictional force generated between the friction ring 31 and the outer peripheral surface of the output shaft 22, rotational resistance is imparted to the output shaft 22.

Claw portions 25a formed on an outer peripheral edge portion of the brake-side side plate 25 are inserted and caulked into cutout depression portions 23c and 33c formed in three protrusions 23b and 33b on outer peripheral edges of the plate-like brake-side outer rings 23 and 33, and into cutout depression portions formed in an outer peripheral edge portion of the cover 24 so that the brake-side side plate 25 is fixed to the brake-side outer rings 23 and 33 and the cover 24 and integrated as the stationary member of the brake-side clutch section 12. Serrated projection and depression portions 23a and 33a are formed over the entire inner peripheral surfaces of the brake-side outer rings 23 and 33 so as to be meshable with the above-mentioned engagement elements 27 and 37, respectively. The projection and depression portions 23a and 33a of the brake-side outer rings 23 and 33 abut on circular-arc outer peripheral surfaces 15e of the columnar portions 15c of the inner ring 15 in a freely slidable manner.

Further, in outer peripheral surfaces of the engagement elements 27 and 37 at their distal end portions abutting on the inner peripheral surfaces of the brake-side outer rings 23 and 33 on a radially outer side, serrated projection and depression portions 27a and 37a are formed so as to be meshable with the above-mentioned brake-side outer rings 23 and 33, respectively. Proximal end portions of the engagement elements 27 and 37, which are positioned on a radially inner side, are fit-inserted into depressed grooves 22e formed in the outer peripheral surface of the output shaft 22 so as to freely protrude and retreat along the radial direction. The engagement elements 27 and 37 are arranged equiangularly in a space surrounded by the inner ring 15, the output shaft 22, the brake-side outer rings 23 and 33, and the brake-side side plate 25.

In this case, in the one-way clutch 50 on one side, the projection and depression portions 23a and 27a formed in the brake-side outer ring 23 and the engagement element 27 each have a serrated shape, whereas in the one-way clutch 51 on another side, the projection and depression portions 33a and 37a formed in the brake-side outer ring 33 and the engagement element 37 each have a reversely serrated shape. In other words, the serrated projection and depression portions 23a and 27a and the reversely serrated projection and depression portions 33a and 37a each have a cross sectional shape comprising parallel surfaces extending along the radial direction and inclined surfaces having a predetermined acute angle with respect to the parallel surfaces, and the inclined surfaces of the projection and depression portions 23a and 27a of the one-way clutch 50 on one side and the inclined surfaces of the projection and depression portions 33a and 37a of the one-way clutch 51 on another side are arranged in opposite directions.

When such a structure is employed, the one-way clutch 50 on one side is capable of locking the rotational torque in the forward direction being a clockwise direction through the meshing of the projection and depression portion 23a of the brake-side outer ring 23 and the projection and depression portion 27a of the engagement element 27, whereas the one-way clutch 51 on another side is capable of locking the rotational torque in the backward direction being a counterclockwise direction through the meshing of the projection and depression portion 33a of the brake-side outer ring 33 and the projection and depression portion 37a of the engagement element 37.

The control means comprises the coil springs 28 serving as elastic members provided between the proximal end portions of the engagement elements 27 and 37 and the depressed grooves 22e of the output shaft 22, and the cam portions 29 and 39 provided between the engagement elements 27 and 37 and the columnar portions 15c of the inner ring 15, respectively. The coil springs 28 are configured to bias, with their elastic forces, the engagement elements 27 and 37 in a direction of engaging the engagement elements 27 and 37 with the brake-side outer rings 23 and 33, in other words, radially outward through the meshing of the projection and depression portions 27a and 37a of the engagement elements 27 and 37 and the projection and depression portions 23a and 33a of the brake-side outer rings 23 and 33, respectively. The cam portions 29 and 39 comprise protrusion portions 27b and 37b formed on the engagement elements 27 and 37 so as to protrude in the circumferential direction, and the columnar portions 15c of the inner ring 15, which are opposed to the protrusion portions 27b and 37b in the circumferential direction, respectively. Tapered surfaces 27c and 37c are formed at end portions of the protrusion portions 27b and 37b of the engagement elements 27 and 37, and tapered surfaces 15f are formed at end portions of the columnar portions 15c of the inner ring 15, respectively. The cam portions 29 and 39 are configured to shift, against the elastic forces of the coil springs 28, the engagement elements 27 and 37 in a direction of disengaging the engagement elements 27 and 37 from the brake-side outer rings 23 and 33, in other words, radially inward through the unmeshing of the projection and depression portions 23a and 27a and the projection and depression portions 33a and 37a, respectively.

In the lever-side clutch section 11 having the above-mentioned structure, when the rotational torque in the forward or backward direction is input to the lever-side outer ring 14, the cylindrical rollers 16 are engaged into the wedge gaps 20 formed between the lever-side outer ring 14 and the inner ring 15, and the inner ring 15 is rotated with the rotational torque transmitted to the inner ring 15 via the cylindrical rollers 16. At this time, elastic forces are accumulated in both the centering springs 18 and 19 along with the rotation of the lever-side outer ring 14 and the cage 17. When the rotational torque is no longer input, the lever-side outer ring 14 and the cage 17 are restored to their neutral states with the elastic forces of both the centering springs 18 and 19, whereas the inner ring 15 is maintained at the given rotational position. Accordingly, the inner ring 15 is rotated in an inching manner through repetitive rotation of the lever-side outer ring 14, in other words, pumping operation of the operation lever 41a (see FIG. 29).

In the brake-side clutch section 12 having the above-mentioned structure, even when the rotational torques in both the forward and backward directions are reversely input to the output shaft 22, as illustrated in FIGS. 3 and 4, the engagement elements 27 and 37 are biased radially outward in a protruding direction with the elastic forces of the coil springs 28, thus leading to a state in which the projection and depression portions 27a and 37a of the engagement elements 27 and 37 are engaged with the projection and depression portions 23a and 33a of the brake-side outer rings 23 and 33, respectively, in other words, a state in which the projection and depression portions 27a and 37a of the engagement elements 27 and 37 are meshed with the projection and depression portions 23a and 33a of the brake-side outer rings 23 and 33, respectively. Accordingly, the output shaft 22 is locked with respect to the brake-side outer rings 23 and 33 serving as the stationary members. In this manner, the rotational torque reversely input from the output shaft 22 is locked by the brake-side clutch section 12, and thus back-flow of the rotational torque to the lever-side clutch section 11 is interrupted.

In this case, as described above, the brake-side clutch section 12 serves as the two-way clutch having the two-layer structure, in which the two one-way clutches 50 and 51 are arranged side by side in the axial direction. The one-way clutch 50 on one side is configured to interrupt the rotational torque in the clockwise direction (forward direction), which is reversely input from the output shaft 22, through the meshing of the serrated projection and depression portions 23a and 27a of the brake-side outer ring 23 and the engagement element 27, whereas the one-way clutch 51 on another side is configured to interrupt the rotational torque in the counterclockwise direction (backward direction), which is reversely input from the output shaft 22, through the meshing of the reversely serrated projection and depression portions 33a and 37a of the brake-side outer ring 33 and the engagement element 37.

As described above, through the meshing of the serrated projection and depression portions 23a and 27a of the one-way clutch 50 on one side and the meshing of the reversely serrated projection and depression portions 33a and 37a of the one-way clutch 51 on another side, the output shaft 22 is locked with respect to the brake-side outer rings 23 and 33 against any of the rotational torques in the clockwise and counterclockwise directions (both forward and backward directions). At this time, the engagement elements 27 and 37 do not slip. Due to such a structure that the engagement elements 27 and 37 do not slip, it is possible to smoothly and reliably interrupt the rotational torque from the output shaft 22 that rotates in the forward and backward directions, and to therefore secure the locked state of the output shaft 22. Particularly in the clutch unit 10 to be built into the automobile seat-lifter section, a significant impact load is applied to the brake-side clutch section 12 at the time of collision of the vehicle as compared to the lever-side clutch section 11. In this brake-side clutch section 12 to which the impact load is applied directly, the engagement elements 27 do not slip, thus facilitating increase in torque capacity for the impact load.

In the one-way clutch 51 on another side of the brake-side clutch section 12, when the rotational torque in the counterclockwise direction (backward direction) is input from the lever-side clutch section 11 to the inner ring 15, as illustrated in FIG. 4, the tapered surfaces 15f of the columnar portions 15c of the inner ring 15 press the tapered surfaces 37c of the protrusion portions 37b of the engagement elements 37 (see the arrow "a" of FIG. 4), and thus the engagement elements 37 are depressed radially inward against the elastic forces of the coil springs 28 (see the arrow "b" of FIG. 4). In this manner, the engagement elements 37 are depressed radially inward and shifted, thus leading to a state in which the projection and depression portions 37a of the engagement elements 37 are disengaged from the projection and depression portion 33a of the brake-side outer ring 33 (see FIG. 5), in other words, a state in which the projection and depression portions 37a of the engagement elements 37 are unmeshed from the projection and depression portion 33a of the brake-side outer ring 33. Accordingly, the locked state of the output shaft 22 is released, and the output shaft 22 is rotated in the counterclockwise direction (backward direction) together with the inner ring 15 through intermediation of the engagement elements 37 (see the arrow "c" of FIG. 4).

Figure 5:
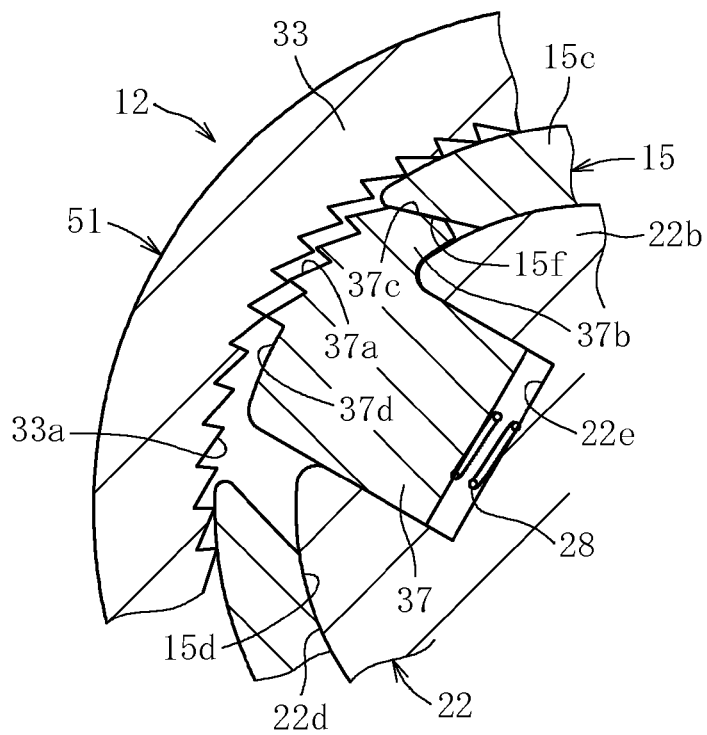
FIG. 5 is an enlarged main part sectional view illustrating a state shifted from the state of FIG. 4 so that projection and depression portions are unmeshed from each other.

At this time, when the tapered surfaces 15f of the columnar portions 15c of the inner ring 15 press the tapered surfaces 37c of the protrusion portions 37b of the engagement elements 37 and thus the columnar portions 15c of the inner ring 15 depress the engagement elements 37, as illustrated in FIG. 5, inner peripheral surfaces of the protrusion portions 37b of the engagement elements 37 abut on the outer peripheral surface of the output shaft 22, to thereby regulate a shift amount of each of the engagement elements 37 that are depressed radially inward. Thus, the engagement elements 37 can be depressed radially inward with a minimum shift amount necessary to disengage the projection and depression portions 37a of the engagement elements 37 from the projection and depression portion 33a of the brake-side outer ring 33, and accordingly the loss of the radially inward shift of the engagement elements 37 can be inhibited.

In the one-way clutch 50 on one side of the brake-side clutch section 12, on the other hand, even when the rotational torque in the counterclockwise direction (backward direction) is input from the lever-side clutch section 11 to the inner ring 15, as illustrated in FIG. 3, the non-contact state between the columnar portions 15c of the inner ring 15 and the engagement elements 27 is maintained before the columnar portions 15c of the inner ring 15 are brought into contact with the protrusion portions 37b of the engagement elements 37 in the one-way clutch 51 on another side. In other words, in the one-way clutch 50 on one side, a gap "m" is present between a counterclockwise side of each columnar portion 15c of the inner ring 15 and the corresponding engagement element 27.

Thus, the one-way clutch 50 on one side can avoid the contact between the counterclockwise side of each columnar portion 15c of the inner ring 15 and the corresponding engagement element 27 before the columnar portions 15c of the inner ring 15 are brought into contact with the protrusion portions 37b of the engagement elements 37 in the one-way clutch 51 on another side. Accordingly, it is possible to secure a timing to disengage the engagement elements 37 of the one-way clutch 51 on another side from the brake-side outer ring 33. Note that, the serrated projection and depression portions 23a and 27a of the one-way clutch 50 on one side are arranged in the opposite direction to that of the serrated shape the projection and depression portions 33a and 37a of the one-way clutch 51 on another side, and hence, along with the rotation of the output shaft 22, the engagement elements 27 are moved in the rotational direction while being moved up and down in conformity with the shape of the serrated projection and depression portion 23a of the brake-side outer ring 23.

Conversely of the above-mentioned case where the rotational torque in the counterclockwise direction (backward direction) is input, in a case where the rotational torque in the clockwise direction (forward direction) is input from the lever-side clutch section 11 to the inner ring 15, in the one-way clutch 50 on one side, as illustrated in FIG. 3, the tapered surfaces 15f of the columnar portions 15c of the inner ring 15 press the tapered surfaces 27c of the protrusion portions 27b of the engagement elements 27, and thus the engagement elements 27 are depressed radially inward and shifted against the elastic forces of the coil springs 28. This leads to a state in which the projection and depression portions 27a of the engagement elements 27 are unmeshed from the projection and depression portion 23a of the brake-side outer ring 23. Accordingly, the locked state of the output shaft 22 is released, and the output shaft 22 is rotated in the clockwise direction (forward direction) together with the inner ring 15 through intermediation of the engagement elements 27.

At this time, in the one-way clutch 51 on another side, as illustrated in FIG. 4, even when the rotational torque in the clockwise direction (forward direction) is input from the lever-side clutch section 11 to the inner ring 15, a gap "n" is present between a clockwise side of each columnar portion 15c of the inner ring 15 and the corresponding engagement element 37, and hence, the one-way clutch 51 on another side can avoid the contact between the clockwise side of each columnar portion 15c of the inner ring 15 and the corresponding engagement element 37 before the columnar portions 15c of the inner ring 15 are brought into contact with the engagement elements 27 in the one-way clutch 50 on one side. Accordingly, it is possible to secure a timing to disengage the engagement elements 27 of the one-way clutch 50 on one side from the brake-side outer ring 23. The projection and depression portions 33a and 37a of the one-way clutch 51 on another side are also arranged in the opposite direction to that of the serrated projection and depression portions 23a and 27a of the one-way clutch 50 on one side, and hence, along with the rotation of the output shaft 22, the engagement elements 37 are moved in the rotational direction while being moved up and down in conformity with the shape of the serrated projection and depression portion 33a of the brake-side outer ring 33.

Note that, the tapered surfaces 15f of the columnar portions 15c of the inner ring 15 press the tapered surfaces 27c and 37c of the protrusion portions 27b and 37b of the engagement elements 27 and 37, and thus the engagement elements 27 and 37 are depressed radially inward against the elastic forces of the coil springs 28. As a result, the projection and depression portions 27a and 37a of the engagement elements 27 and 37 are unmeshed from the projection and depression portions 23a and 33a of the brake-side outer rings 23 and 33, respectively. At this time, the engagement elements 27 and 37 are moved along the radial direction toward a rotational center, and hence the projection and depression portions 27a and 37a are formed only on one side of the engagement elements 27 and 37 with respect to their centerlines extending in the radial direction (side on which the engagement elements 27 and 37 abut on the columnar portions 15c of the inner ring 15), respectively, but the projection and depression portions 27a and 37a are not formed on another side of the engagement elements 27 and 37 with respect to their center lines extending in the radial direction (side on which the engagement elements 27 and 37 do not abut on the columnar portions 15c of the inner ring 15) and circular-arc surfaces 27d and 37d are formed instead, respectively.

Thus, when the engagement elements 27 and 37 are to be depressed radially inward, the projection and depression portions 27a and 37a of the engagement elements 27 and 37 are not caught on the projection and depression portions 23a and 33a of the brake-side outer rings 23 and 33, and accordingly the projection and depression portions 27a and 37a of the engagement elements 27 and 37 are smoothly unmeshed from the projection and depression portions 23a and 33a of the brake-side outer rings 23 and 33, respectively.

Figure 6:
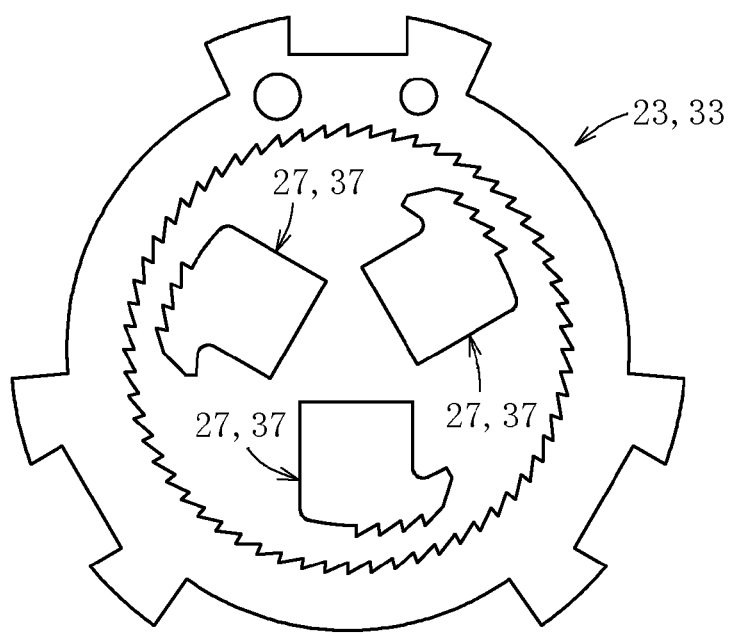
FIG. 6 is a side view illustrating one brake-side outer ring and three engagement elements, which are obtained by stamping a single blank.

When manufacturing the above-mentioned clutch unit, the brake-side outer rings 23 and 33 and the engagement elements 27 and 37 of the brake-side clutch section 12 can be manufactured as illustrated in FIG. 6. Specifically, one brake-side outer ring 23 and three engagement elements 27 can be manufactured at the same time by, for example, stamping a single blank, and one brake-side outer ring 33 and three engagement elements 37 can be manufactured at the same time by, for example, stamping a single blank. With this method, cost can be reduced in the manufacture of the clutch unit.

Further, the above description is directed to the case where the brake-side clutch section 12 comprises the three engagement elements 27 and the three engagement elements 37, but the numbers of the engagement elements 27 and 37 may be set arbitrarily, and three or more engagement elements 27 and 37 may be provided alternatively. In this case, the inner ring 15 also comprises three or more columnar portions 15c in accordance with the numbers of the engagement elements 27 and 37.

Figure 7:
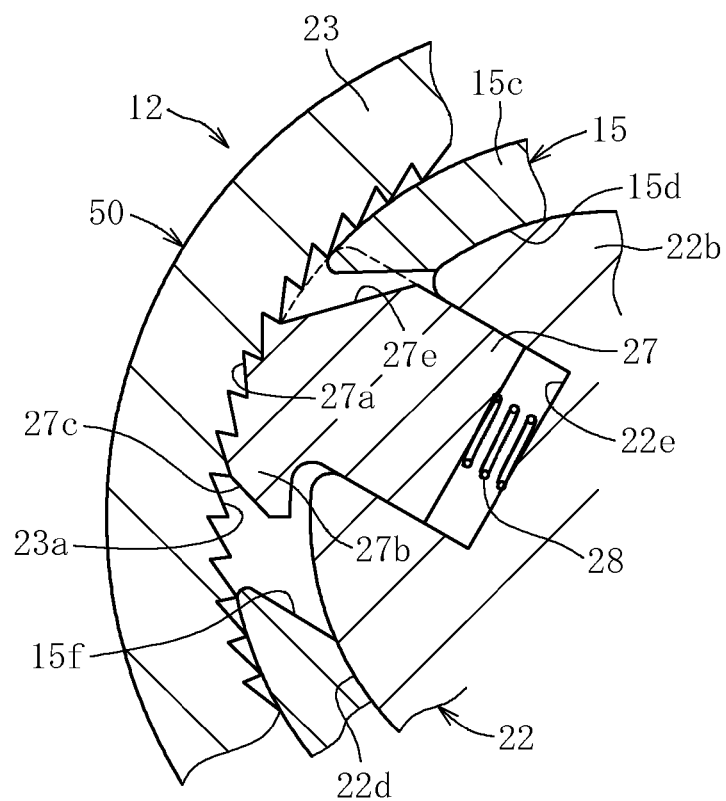
FIG. 7 is an enlarged main part sectional view illustrating a modification example of the engagement element.

In a case where the non-contact state between the columnar portions 15c of the inner ring 15 and the engagement elements 27 is hard to maintain in the one-way clutch 50 on one side before the columnar portions 15c of the inner ring 15 are brought into contact with the protrusion portions 37b of the engagement elements 37 in the one-way clutch 51 on another side due to, for example, the above-mentioned case where the numbers of the engagement elements 27 and 37 and the columnar portions 15c of the inner ring 15 are increased, it is effective to cut out, as illustrated in FIG. 7, an edge portion opposite to each protrusion portion 27b of the engagement element 27 (portion indicated by the broken line of FIG. 7) so as to form a tapered portion 27e.

Through the formation of such a tapered portion 27e, a gap can be formed between each columnar portion 15c of the inner ring 15 and the tapered portion 27e of the corresponding engagement element 27, and thus the one-way clutch 50 on one side can avoid the contact between each columnar portion 15c of the inner ring 15 and the corresponding engagement element 27 before the columnar portions 15c of the inner ring 15 are brought into contact with the protrusion portions 37b of the engagement elements 37 in the one-way clutch 51 on another side. Note that, the above description is directed to the case where the tapered portion 27e is formed on each engagement element 27 of the one-way clutch 50 on one side, but a tapered portion may similarly be formed on each engagement element 37 of the one-way clutch 51 on another side.

In the brake-side clutch section 12, the inner ring 15, the output shaft 22, and the coil springs 28 are each shared by the two one-way clutches 50 and 51, whereas the engagement elements 27 and 37 and the brake-side outer rings 23 and 33 are each formed of different members between the two one-way clutches 50 and 51. In this case, as described above, the engagement elements 27 and 37 have such shapes that the projection and depression portions 27a and 37a are formed only on one side of the engagement elements 27 and 37 with respect to their center lines extending in the radial direction (side on which the engagement elements 27 and 37 abut on the columnar portions 15c of the inner ring 15), respectively, but the projection and depression portions 27a and 37a are not formed on another side (side on which the engagement elements 27 and 37 do not abut on the columnar portions 15c of the inner ring 15) and the circular-arc surfaces 27d and 37d are formed instead, respectively.

With the shapes as described above, it is possible to achieve such a structure that the engagement element 27 of the one-way clutch 50 on one side and the engagement element 37 of the one-way clutch 51 on another side are arranged in a reverse relationship with respect to their center lines extending in the radial direction. Thus, the engagement element 27 of the one-way clutch 50 on one side and the engagement element 37 of the one-way clutch 51 on another side can be fitted into the common depressed groove 22e of the output shaft 22 in the reverse arrangement relationship with respect to their center lines extending in the radial direction. Accordingly, as the one-way clutch 50 on one side and the one-way clutch 51 on another side, the two one-way clutches 50 and 51 having the same structure can be used in combination, and thus the cost of the clutch unit can be reduced.

Figure 8:
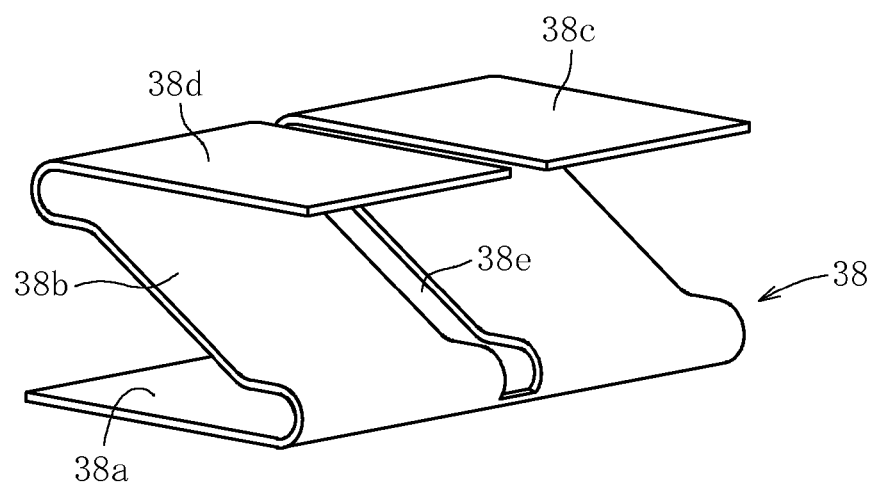
FIG. 8 is an enlarged main part perspective view illustrating a modification example of an elastic member.

Further, the above description is directed to the case where the coil springs 28 are used as the elastic members provided between the proximal end portions of the engagement elements 27 and 37 and the depressed grooves 22e of the output shaft 22 so that the elastic members are shared by the two one-way clutches 50 and 51. Alternatively, N-shaped plate springs 38 each having a slit 38e formed at its center as illustrated in FIG. 8 may be employed as other elastic members. When the common plate springs 38 are employed for the engagement elements 27 of the one-way clutch 50 on one side and the engagement elements 37 of the one-way clutch 51 on another side as described above, the elastic members can be shared by the two one-way clutches 50 and 51. As a result, the number of components can be reduced and the assembling workability can be enhanced, thus facilitating the reduction in cost of the entire clutch unit.

Each of the plate springs 38 has such a structure that a proximal portion 38a to be arranged at a bottom portion of the depressed groove 22e of the output shaft 22 is shared by the one-way clutch 50 on one side and the one-way clutch 51 on another side and the slit 38e is formed in a region of from a folding portion 38b extending from the proximal portion 38a to distal end portions 38c and 38d to be brought into abutment on the proximal end portions of the engagement elements 27 and 37 so as to divide the plate spring 38 for the one-way clutch 50 on one side and the one-way clutch 51 on another side. When such plate springs 38 are employed, the elastic forces can independently be applied to the engagement elements 27 of the one-way clutch 50 on one side and the engagement elements 37 of the one-way clutch 51 on another side.

Figure 9:
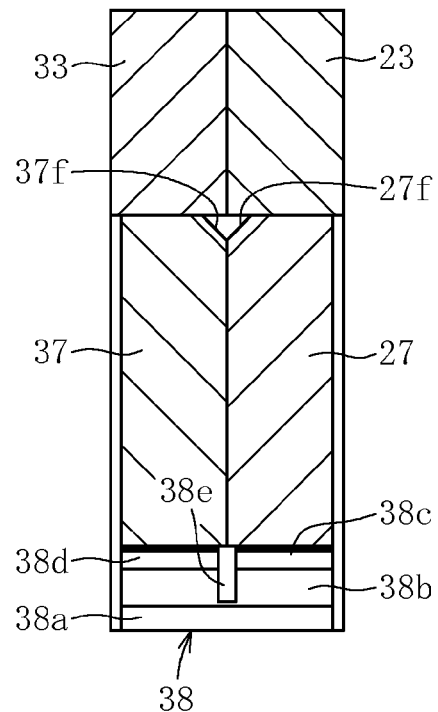
FIG. 9 is a partially enlarged sectional view illustrating an example of the engagement element and the brake-side outer ring in a case where the elastic member of FIG. 8 is used.
Figure 10:
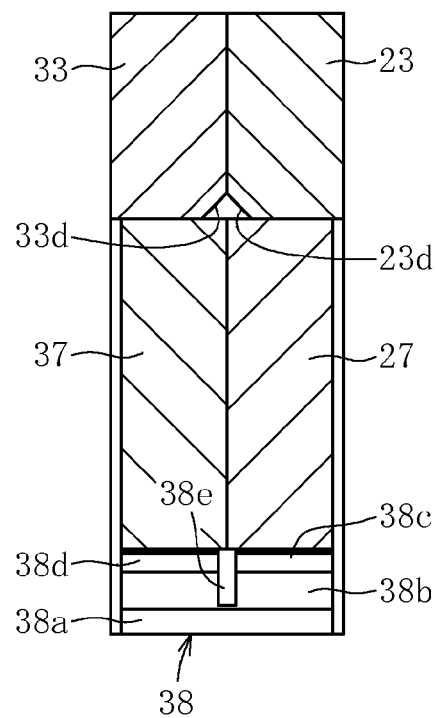
FIG. 10 is a partially enlarged sectional view illustrating another example of the engagement element and the brake-side outer ring in the case where the elastic member of FIG. 8 is used.

Further, in the two one-way clutches 50 and 51, as illustrated in FIGS. 9 and 10, the two engagement elements 27 and 37 and the two brake-side outer rings 23 and 33, which are arranged side by side in the axial direction, are held in an abutting state. In the case of this structure, it is effective to employ, as illustrated in FIG. 9, such a structure that chamfers 27f and 37f are formed at edge portions of the engagement elements 27 and 37, which are held in abutment on the brake-side outer rings 23 and 33, respectively. Alternatively, as illustrated in FIG. 10, chamfers 23d and 33d may be formed at edge portions of the brake-side outer rings 23 and 33, which are held in abutment on the engagement elements 27 and 37, respectively.

Due to such a structure that the chamfers 27f and 37f or the chamfers 23d and 33d are formed as described above, even when the engagement elements 27 or 37 of any one of the two one-way clutches 50 and 51 arranged side by side in the axial direction are moved by an amount corresponding to a tolerance in the axial direction, the engagement elements 27 or 37 of the one of the two one-way clutches 50 and 51 do not interfere with the brake-side outer ring 23 or 33 or the engagement elements 27 or 37 of another of the two one-way clutches 50 and 51, and hence the two one-way clutches 50 and 51 can be operated smoothly. Note that, FIGS. 9 and 10 illustrate a case where the N-shaped plate spring 38 is applied as the elastic member, but the present invention is similarly applicable to a case where the coil spring 28 is used instead.

Figure 11A:
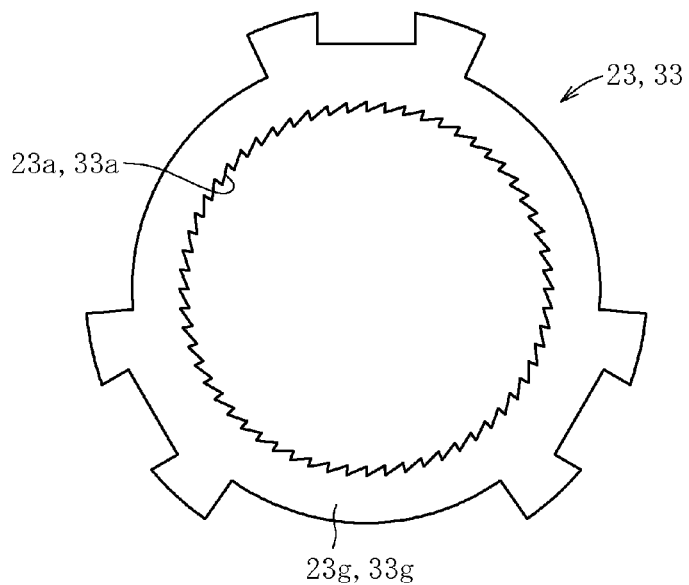
FIG. 11A is a side view illustrating the brake-side outer ring according to the embodiment of the present invention.
Figure 11B:
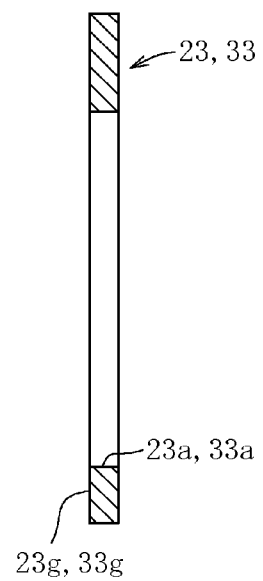
FIG. 11B is a sectional view of FIG. 11A.

As the brake-side outer ring 23 of the one-way clutch 50 on one side and the brake-side outer ring 33 of the one-way clutch 51 on another side, brake-side outer rings having the same shape are arranged in abutment on each other with the same surfaces facing each other, and hence the projection and depression portion 23a of the brake-side outer ring 23 on one side has a serrated shape, whereas the projection and depression portion 33a of the brake-side outer ring 33 on another side has a reversely serrated shape. In the above-mentioned embodiment, as illustrated in FIGS. 11A and 11B, abutment surfaces 23g and 33g of both the brake-side outer rings 23 and 33 have a flat shape over the entire periphery thereof. As another embodiment of the present invention, a structure as illustrated in FIGS. 12A and 12B is effective.

Figure 12A:
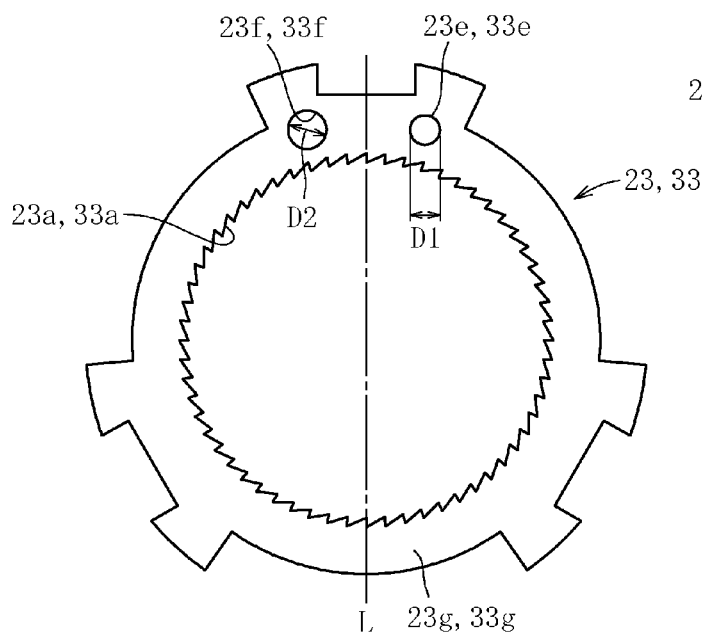
FIG. 12A is a side view illustrating a brake-side outer ring according to another embodiment of the present invention.
Figure 12B:
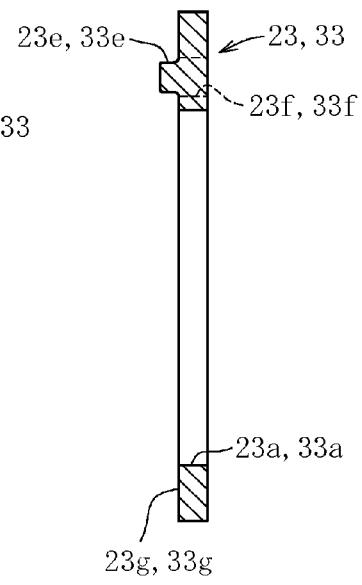
FIG. 12B is a sectional view of FIG. 12A.

In the embodiment illustrated in FIGS. 12A and 12B, a pair of a protrusion 23e and a hole 23f is formed in the abutment surface 23g of the brake-side outer ring 23, whereas a pair of a protrusion 33e and a hole 33f is formed in the abutment surface 33g of the brake-side outer ring 33. The protrusion 23e and the hole 33f are fitted together and the protrusion 33e and the hole 23f are fitted together under a state in which the directions of interrupting the rotational torque through the meshing of the projection and depression portions 23a and 33a are opposite to each other. The protrusion 23e and the hole 23f are formed at positions line symmetric with respect to a center line L of the brake-side outer ring 23, whereas the protrusion 33e and the hole 33f are formed at positions line symmetric with respect to a center line L of the brake-side outer ring 33. Further, inner diameters D2 of the holes 23f and 33f are set slightly larger than outer diameters D1 of the protrusions 23e and 33e (D1<D2) so as to achieve smooth fitting between the protrusion 23e and the hole 33f and between the protrusion 33e and the hole 23f.

As described above, the pair of the protrusion 23e and the hole 23f is formed in the abutment surface 23g of the brake-side outer ring 23, whereas the pair of the protrusion 33e and the hole 33f is formed in the abutment surface 33g of the brake-side outer ring 33. The protrusion 23e and the hole 33f are fitted together and the protrusion 33e and the hole 23f are fitted together under the state in which the directions of interrupting the rotational torque through the meshing of the projection and depression portions 23a and 33a are opposite to each other. Accordingly, the brake-side outer rings 23 and 33 having the same structure are used in the one-way clutch 50 on one side and the one-way clutch 51 on another side, respectively, and thus the cost of the clutch unit can be reduced. Further, when manufacturing the clutch unit, the brake-side outer rings 23 and 33 of the two one-way clutches 50 and 51 can reliably be assembled into the state in which the directions of interrupting the rotational torque through the meshing of the projection and depression portions 23a and 33a are opposite to each other.

Figure 13A:
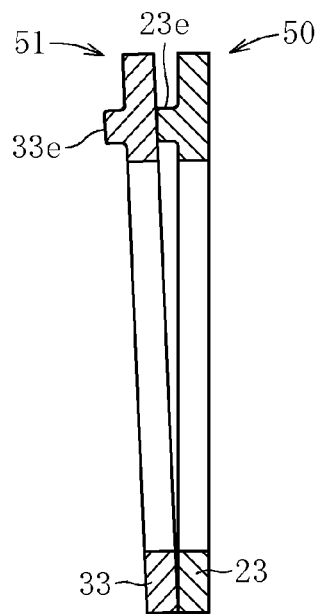
FIG. 13A is a sectional view illustrating a state in which two brake-side outer rings are brought into abutment on each other with different surfaces facing each other according to the another embodiment of the present invention.
Figure 13B:
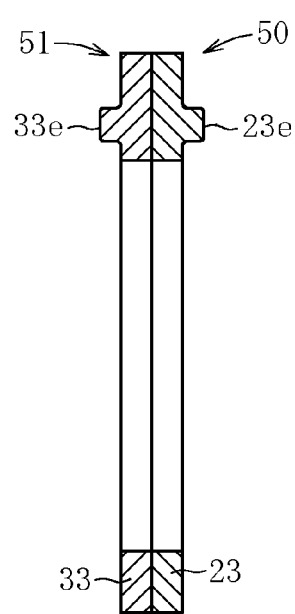
FIG. 13B is a sectional view illustrating a state in which the two brake-side outer rings are brought into abutment on each other with their back surfaces facing each other according to the another embodiment of the present invention.

Specifically, when the two brake-side outer rings 23 and 33 are brought into abutment on each other under a state in which the directions of interrupting the rotational torque through the meshing of the projection and depression portions 23a and 33a are identical to each other (with different surfaces facing each other), as illustrated in FIG. 13A, the protrusions 23e and 33e of both the brake-side outer rings 23 and 33 are oriented in the same direction. As a result, both the brake-side outer rings 23 and 33 cannot be brought into abutment on each other under a proper state. Further, when the two brake-side outer rings 23 and 33 are brought into abutment on each other under a state in which the directions of interrupting the rotational torque through the meshing of the projection and depression portions 23a and 33a are identical to each other (with the back surfaces facing each other), as illustrated in FIG. 13B, the protrusions 23e and 33e of both the brake-side outer rings 23 and 33 are oriented outward in opposite directions. As a result, both the protrusions 23e and 33e hinder both the brake-side outer rings 23 and 33 from being assembled to the clutch unit.

Figure 13C:
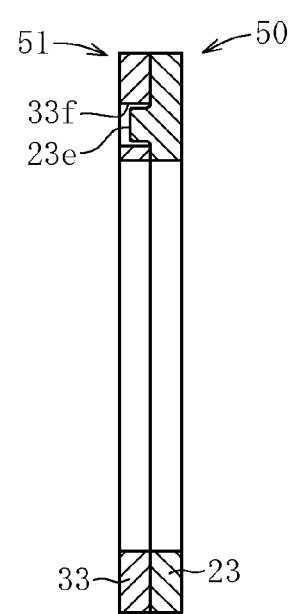
FIG. 13C is a sectional view illustrating a state in which the two brake-side outer rings are brought into abutment on each other with the same surfaces facing each other (with their front surfaces facing each other) according to the another embodiment of the present invention.

In contrast, when the two brake-side outer rings 23 and 33 are brought into abutment on each other under the state in which the directions of interrupting the rotational torque through the meshing of the projection and depression portions 23a and 33a are opposite to each other [with the same surfaces facing each other (with the front surfaces facing each other)], as illustrated in FIG. 13C, the protrusion 23e of the brake-side outer ring 23 on one side is fitted into the hole 33f of the brake-side outer ring 33 on another side, whereas the protrusion 33e of the brake-side outer ring 33 on another side is fitted into the hole 23f of the brake-side outer ring 23 on one side. As a result, both the brake-side outer rings 23 and 33 can be brought into abutment on each other under the proper state.

Figure 14:
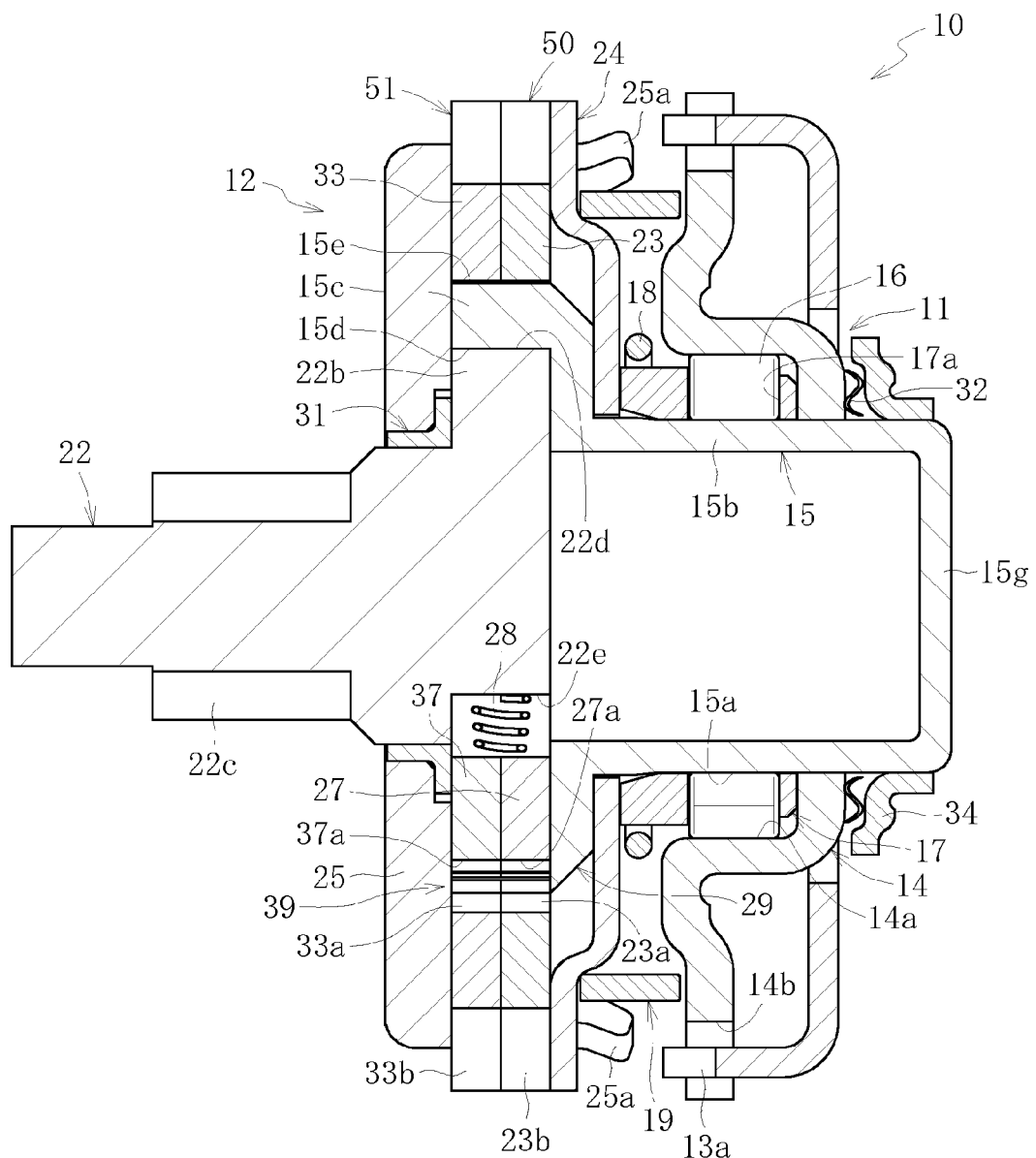
FIG. 14 is a sectional view illustrating an overall structure of a clutch unit according to a further embodiment of the present invention.

The above-mentioned embodiments are directed to the structure comprising such an output shaft 22 that the large diameter portion 22b, which is increased in diameter by extending radially outward from the shaft portion 22a having the cylindrical portion 15b of the inner ring 15 inserted externally thereon in the lever-side clutch section 11, is integrally formed substantially in the axial center region, and that the pinion gear 22c extending in the axial direction from the large diameter portion 22b is formed coaxially with the large diameter portion 22b, and having the washer 34 press-fitted onto the shaft portion 22a of the output shaft 22 through intermediation of the wave washer 32 (see FIG. 1). As another embodiment of the present invention, a structure as illustrated in FIG. 14 may be employed. Note that, in FIG.

14, the same or corresponding parts as or to those of FIG. 1 are represented by the same reference symbols, and redundant description is therefore omitted herein.

A clutch unit according to the embodiment illustrated in FIG. 14 has such a structure that a bottom portion 15g is formed by extending an end portion of the cylindrical portion 15b of the inner ring 15 radially inward, and that detachment of the components is prevented by press-fitting the washer 34 onto the end portion of the cylindrical portion 15b of the inner ring 15 through intermediation of the wave washer 32. Due to such a structure that the bottom portion 15g is formed at the end portion of the cylindrical portion 15b, the strength of the cylindrical portion 15b of the inner ring 15 can be secured. When such a structure is employed, the shaft portion 22a (see FIG. 1) of the output shaft 22, which is positioned at the lever-side clutch section 11, is omitted so that the cylindrical portion 15b can be formed into a hollow shape. As a result, the output shaft 22 can be structured so that the shaft portion 22a is omitted and the pinion gear 22c extending in the axial direction from the large diameter portion 22b is formed integrally with the large diameter portion 22b. Thus, the clutch unit can be light-weighted.

Figure 15:
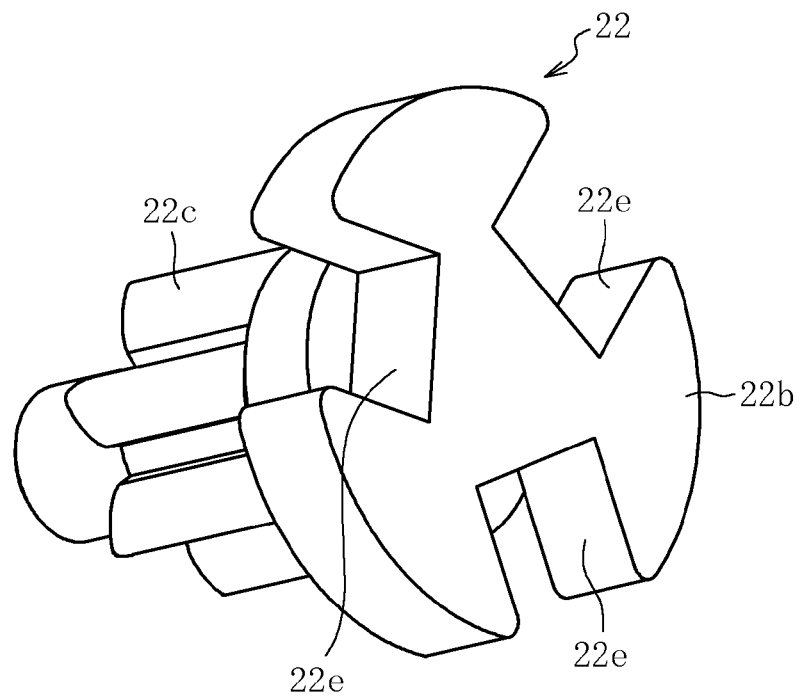
FIG. 15 is a perspective view illustrating an output shaft of FIG. 14 as seen from a large diameter portion side thereof.
Figure 16:
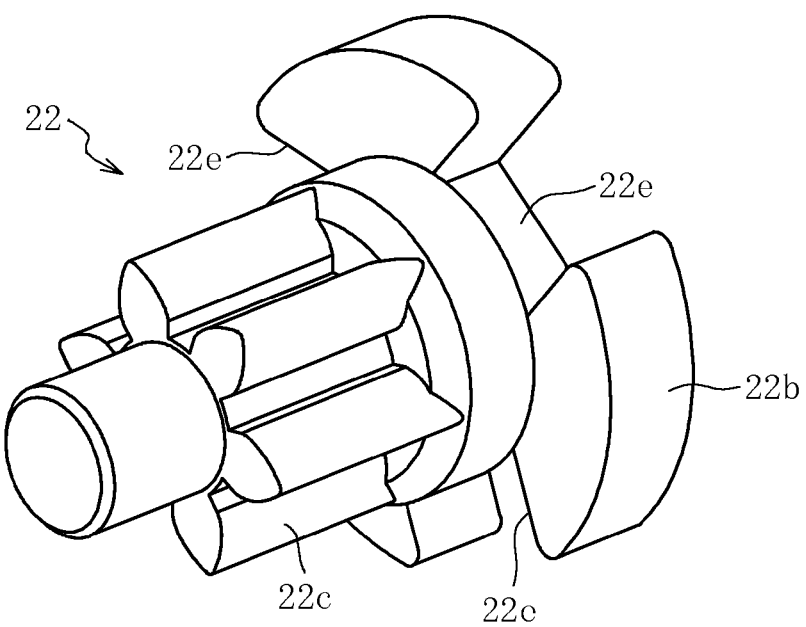
FIG. 16 is a perspective view illustrating the output shaft of FIG. 14 as seen from a pinion gear side thereof.
Figure 17:
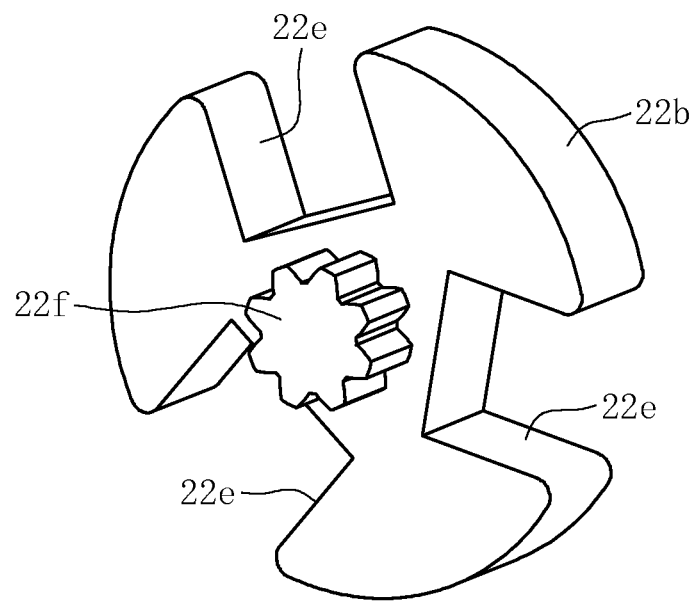
FIG. 17 is a perspective view illustrating a large diameter portion formed on one of two segments of an output shaft according to a still further embodiment of the present invention.
Figure 18:
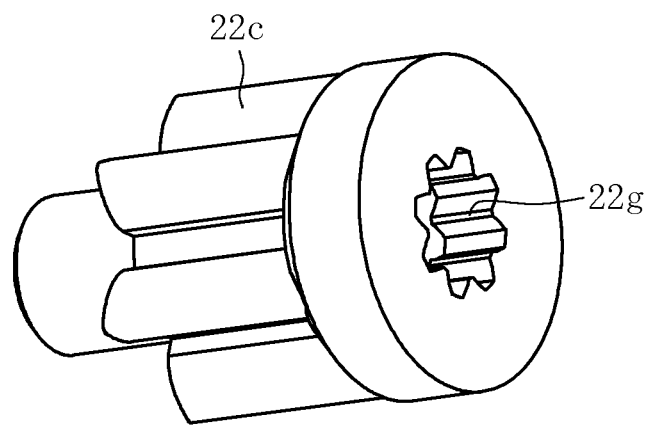
FIG. 18 is a perspective view illustrating a pinion gear formed on another of the two segments of the output shaft according to the still further embodiment of the present invention.

In the clutch unit according to the embodiment illustrated in FIG. 14, on the other hand, as illustrated in FIGS. 15 and 16, there is exemplified such an output shaft 22 that the large diameter portion 22b having formed therein the depressed grooves 22e, into which the proximal end portions of the engagement elements 27 and 37 are to be fit-inserted, and the pinion gear 22c extending in the axial direction from the large diameter portion 22b are formed integrally with each other. Alternatively, as illustrated in FIGS. 17 and 18, there may be employed such a structure that the output shaft 22 is divided into two segments comprising the large diameter portion 22b and the pinion gear 22c.

Figure 29:
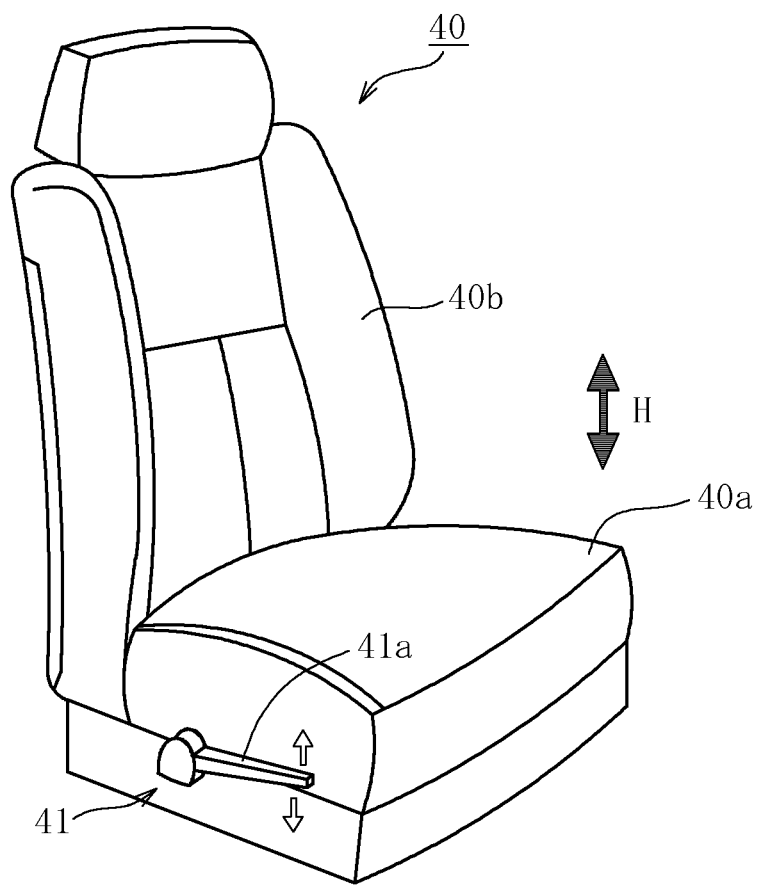
FIG. 29 is a perspective view illustrating a seat of an automobile.

The output shaft 22 of the two-segment type comprises, as separate members, the large diameter portion 22b having formed equiangularly therein the depressed grooves 22e, into which the proximal end portions of the engagement elements 27 and 37 are to be fit-inserted, and the pinion gear 22c to be coupled to the seat-lifter section 41 (see FIG. 29). In the large diameter portion 22b, as illustrated in FIG. 17, a protruding shaft 22f having a male spline formed on its outer peripheral surface is formed on a surface of the large diameter portion 22b to be joined to the pinion gear 22c. In the pinion gear 22c, as illustrated in FIG. 18, a shaft hole 22g having a female spline formed on its inner peripheral surface is formed in a surface of the pinion gear 22c to be joined to the large diameter portion 22b. The protruding shaft 22f of the large diameter portion 22b is press-fitted into the shaft hole 22g of the pinion gear 22c to achieve spline fitting, and thus the large diameter portion 22b and the pinion gear 22c are coupled to each other so as to allow torque transmission therebetween. Note that, the large diameter portion 22b and the pinion gear 22c may be fixed to each other by welding after the protruding shaft 22f of the large diameter portion 22b is press-fitted into the shaft hole 22g of the pinion gear 22c. Due to such a structure that the large diameter portion 22b and the pinion gear 22c are fixed to each other by welding, the coupling strength between the large diameter portion 22b and the pinion gear 22c can be enhanced.

When the structure that the output shaft 22 is divided into two segments comprising the large diameter portion 22b and the pinion gear 22c is employed as described above, the pinion gear 22c being one member may be formed as a quenched member, whereas the large diameter portion 22b being another member may be formed as an unquenched member. Specifically, the pinion gear 22c directly receives a load from the seat-lifter section 41, and hence the pinion gear 22c needs to secure its strength. For this reason, heat treatment such as quenching is necessary for the pinion gear 22c. On the other hand, the large diameter portion 22b does not need to secure its strength as compared to the pinion gear 22c, and hence the heat treatment such as quenching is unnecessary for the large diameter portion 22b. Due to such a structure that the heat treatment is unnecessary for the large diameter portion 22b, the manufacturing process can be simplified and the cost of the clutch unit can be reduced.

Further, when manufacturing the output shaft 22 having the large diameter portion 22b and the pinion gear 22c formed integrally with each other, it is necessary to carry out a step of cutting the large diameter portion 22b by milling so as to form the depressed grooves 22e after the output shaft 22 is formed by cold forging. When manufacturing the output shaft 22 of the two-segment type comprising the large diameter portion 22b and the pinion gear 22c as separate members, however, it is unnecessary to carry out the step of cutting the large diameter portion 22b by milling so as to form the depressed grooves 22e. Thus, the manufacturing process can be simplified and the cost of the clutch unit can be reduced.

The above-mentioned embodiments are directed to the brake-side clutch section 12 serving as the two-way clutch having the two-layer structure, in which the two one-way clutches 50 and 51 are arranged side by side in the axial direction. Alternatively, the brake-side clutch section 12 may be formed of a single two-way clutch. Note that, the same or corresponding parts as or to those of the embodiment illustrated in FIGS. 1, 3, and 4 are represented by the same reference symbols, and redundant description is therefore omitted herein.

Figure 19:
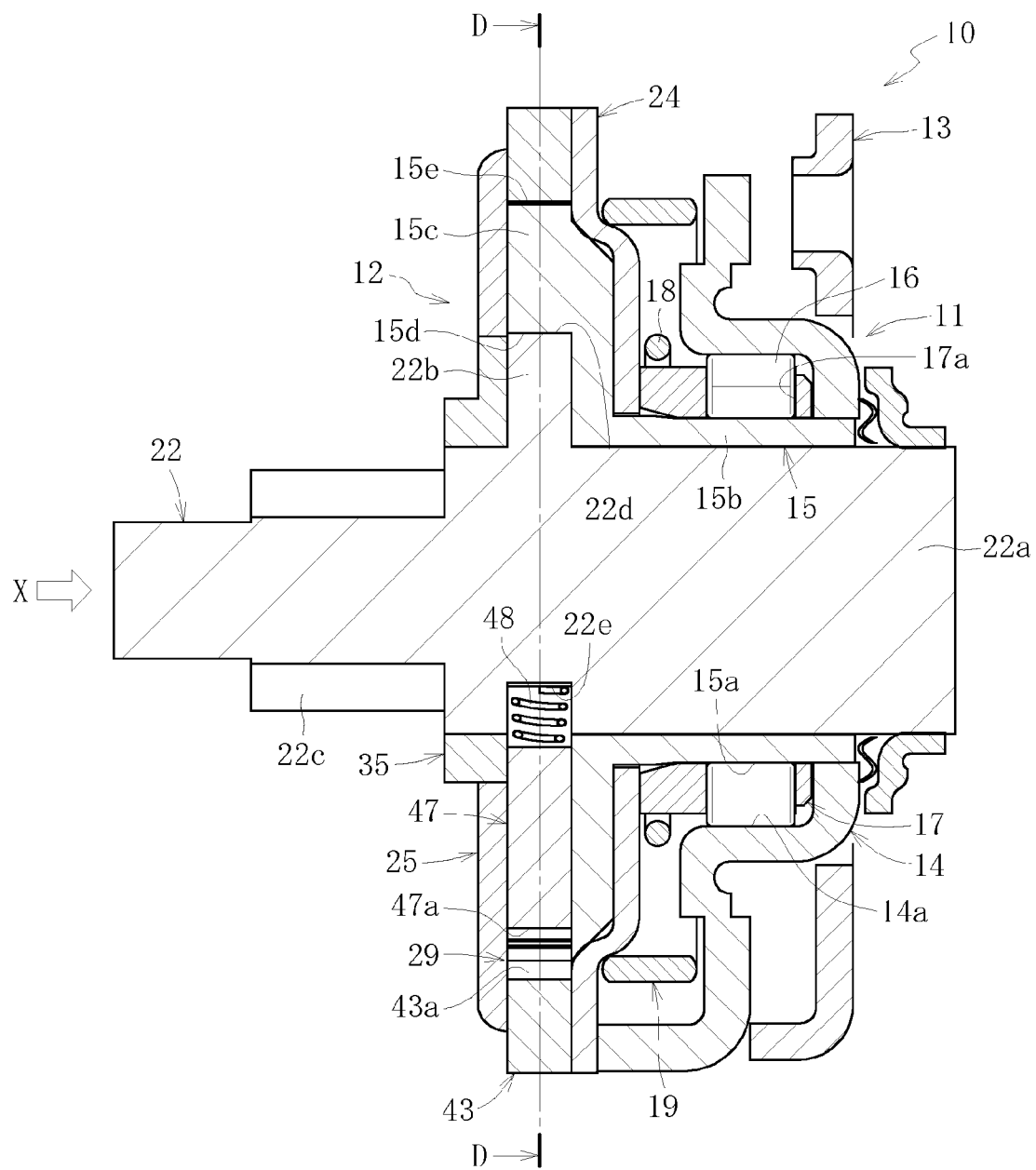
FIG. 19 is a sectional view illustrating an overall structure of a clutch unit according to a yet further embodiment of the present invention.
Figure 20:
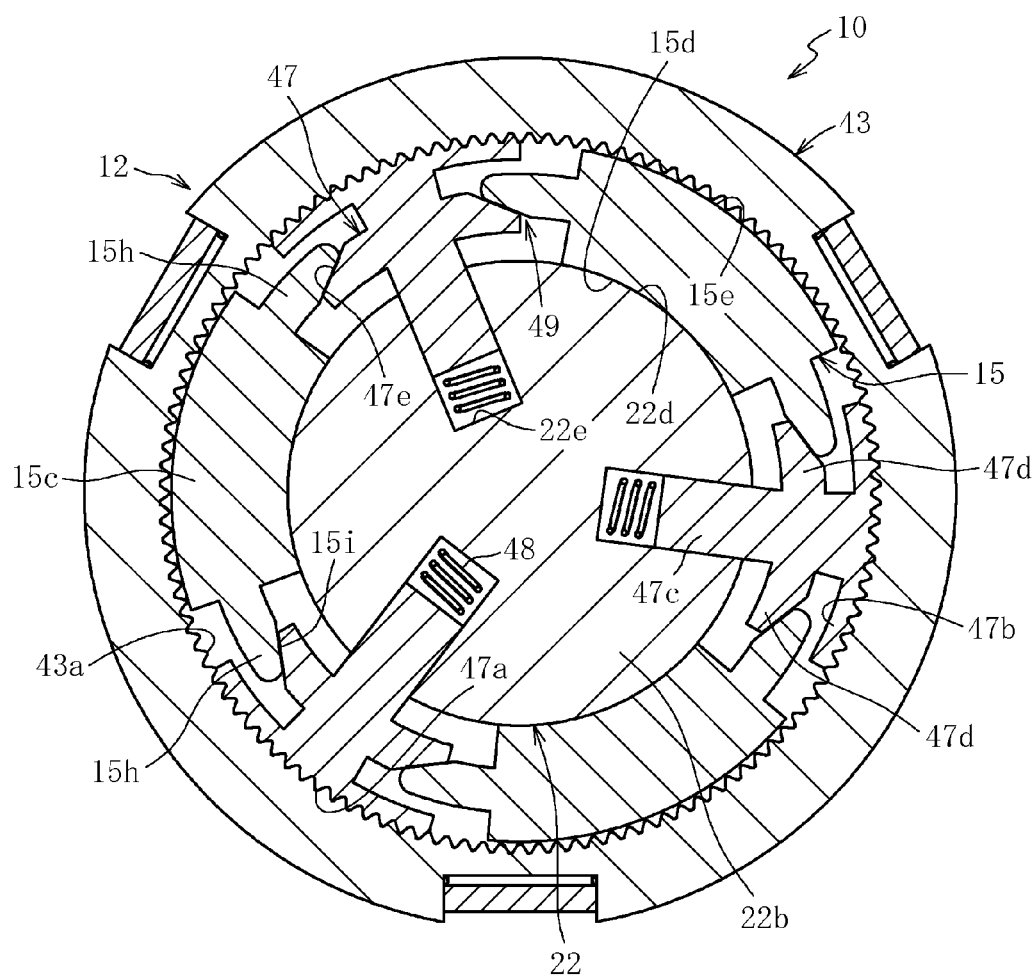
FIG. 20 is a sectional view taken along the line D-D of FIG. 19.

As illustrated in FIGS. 19 and 20, the brake-side clutch section 12 of this embodiment comprises a plurality of (in FIG. 20, three) engagement elements 47 arranged between a brake-side outer ring 43 and the output shaft 22, for interrupting the rotational torque to be reversely input from the output shaft 22 through engagement between the brake-side outer ring 43 and the output shaft 22, and transmitting the rotational torque to be input from the inner ring 15 through disengagement between the brake-side outer ring 43 and the output shaft 22, and control means for engaging, at the time of interrupting the rotational torque, the engagement elements 47 between the brake-side outer ring 43 and the output shaft 22 through meshing of projection and depression portions 43a and 47a, and disengaging, at the time of transmitting the rotational torque, the engagement elements 47 between the brake-side outer ring 43 and the output shaft 22 through unmeshing of the projection and depression portions 43a and 47a.

The angular projection and depression portion 43a is formed over the entire inner peripheral surface of the brake-side outer ring 43 so as to be meshable with the above-mentioned engagement elements 47. The projection and depression portion 43a of the brake-side outer ring 43 abuts on the circular-arc outer peripheral surfaces 15e of the columnar portions 15c of the inner ring 15 in a freely slidable manner.

Further, the engagement elements 47 each have a substantially T-shape. The angular projection and depression portions 47a are formed in circular-arc outer peripheral surfaces of head portions 47b positioned on the radially outer side so as to be meshable with the above-mentioned brake-side outer ring 43. Leg portions 47c positioned on the radially inner side are fit-inserted into the depressed grooves 22e formed in the outer peripheral surface of the output shaft 22 so as to freely protrude and retreat along the radial direction. The engagement elements 47 are arranged in a space surrounded by the inner ring 15, the output shaft 22, the brake-side outer ring 43, and the brake-side side plate 25.

The control means comprises coil springs 48 serving as elastic members provided between the leg portions 47c of the engagement elements 47 and the depressed grooves 22e of the output shaft 22, and cam portions 49 provided between the engagement elements 47 and the inner ring 15. The coil springs 48 are configured to bias, with their elastic forces, the engagement elements 47 in a direction of engaging the engagement elements 47 with the brake-side outer ring 43, in other words, radially outward through the meshing of the projection and depression portions 47a of the engagement elements 47 and the projection and depression portion 43a of the brake-side outer ring 43. The cam portions 49 comprise arm portions 47d formed on the engagement elements 47 so as to protrude in the circumferential direction, and arm portions 15h formed on the columnar portions 15c of the inner ring 15 so as to protrude in the circumferential direction. Tapered surfaces 47e are formed on outer peripheral surfaces of the arm portions 47d of the engagement elements 47, and tapered surfaces 15i are formed on inner peripheral surfaces of the arm portions 15h of the columnar portions 15c of the inner ring 15. The cam portions 49 are configured to shift, against the elastic forces of the coil springs 48, the engagement elements 47 in a direction of disengaging the engagement elements 47 from the brake-side outer ring 43, in other words, radially inward through the unmeshing of the projection and depression portions 43a and 47a.

In the brake-side clutch section 12 having the above-mentioned structure, even when the rotational torques in both the forward and backward directions are reversely input to the output shaft 22, as illustrated in FIG. 20, the engagement elements 47 are biased radially outward in a protruding direction with the elastic forces of the coil springs 48, thus leading to a state in which the projection and depression portions 47a of the head portions 47b of the engagement elements 47 are engaged with the projection and depression portion 43a of the brake-side outer ring 43, in other words, a state in which the projection and depression portions 47a of the engagement elements 47 are meshed with the projection and depression portion 43a of the brake-side outer ring 43. Accordingly, the output shaft 22 is locked with respect to the brake-side outer ring 43 serving as the stationary member. In this manner, the rotational torque reversely input from the output shaft 22 is locked by the brake-side clutch section 12, and thus back-flow of the rotational torque to the lever-side clutch section 11 is interrupted.

Figure 21:
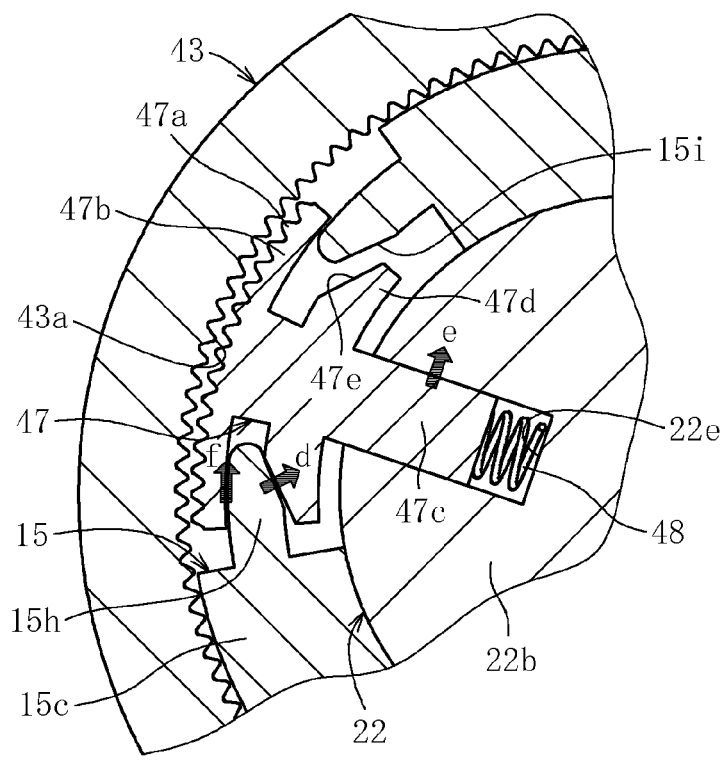
FIG. 21 is an enlarged main part sectional view illustrating a state shifted from the state of FIG. 20 so that projection and depression portions are unmeshed from each other.

In the brake-side clutch section 12, when the rotational torque is input from the lever-side clutch section 11 to the inner ring 15, as illustrated in FIG. 21, the tapered surfaces 15i of the arm portions 15h of the inner ring 15 press the tapered surfaces 47e of the arm portions 47d of the engagement elements 47 (see the arrow "d" of FIG. 21), and thus the engagement elements 47 are depressed radially inward against the elastic forces of the coil springs 48. In this manner, the engagement elements 47 are depressed radially inward and shifted, thus leading to a state in which the projection and depression portions 47a of the engagement elements 47 are disengaged from the projection and depression portion 43a of the brake-side outer ring 43, in other words, a state in which the projection and depression portions 47a of the engagement elements 47 are unmeshed from the projection and depression portion 43a of the brake-side outer ring 43. Accordingly, the locked state of the output shaft 22 is released, and the output shaft 22 is rotated together with the inner ring 15 through intermediation of the engagement elements 47 (see the arrow "e" of FIG. 21).

At this time, the tapered surfaces 15i of the arm portions 15h of the inner ring 15 press the tapered surfaces 47e of the arm portions 47d of the engagement elements 47 (see the arrow "d" of FIG. 21), and outer peripheral surfaces of the arm portions 15h of the inner ring 15 abut on inner peripheral surfaces of the head portions 47b of the engagement elements 47 (see the arrow "f" of FIG. 21), to thereby regulate a shift amount of each of the engagement elements 47 that are depressed radially inward. Thus, the engagement elements 47 can be depressed radially inward with a minimum shift amount necessary to disengage the projection and depression portions 47a of the engagement elements 47 from the projection and depression portion 43a of the brake-side outer ring 43, and accordingly the loss of the radially inward shift of the engagement elements 47 can be inhibited.

As described above, through the meshing of the projection and depression portions 43a and 47a between the brake-side outer ring 43 and the output shaft 22, the engagement elements 47 are engaged between the brake-side outer ring 43 and the output shaft 22 at the time of interrupting the rotational torque, and through the unmeshing of the projection and depression portions 43a and 47a between the brake-side outer ring 43 and the output shaft 22, the engagement elements 47 are disengaged between the brake-side outer ring 43 and the output shaft 22 at the time of transmitting the rotational torque. Particularly when the engagement elements 47 are to be engaged between the brake-side outer ring 43 and the output shaft 22 through the meshing of the projection and depression portions 43a and 47a between the brake-side outer ring 43 and the output shaft 22, the engagement elements 47 do not slip on the brake-side outer ring 43. Due to such a structure that the engagement elements 47 do not slip, it is possible to smoothly and reliably interrupt the rotational torque from the output shaft 22, and to therefore secure the locked state of the output shaft 22.

Figure 22:
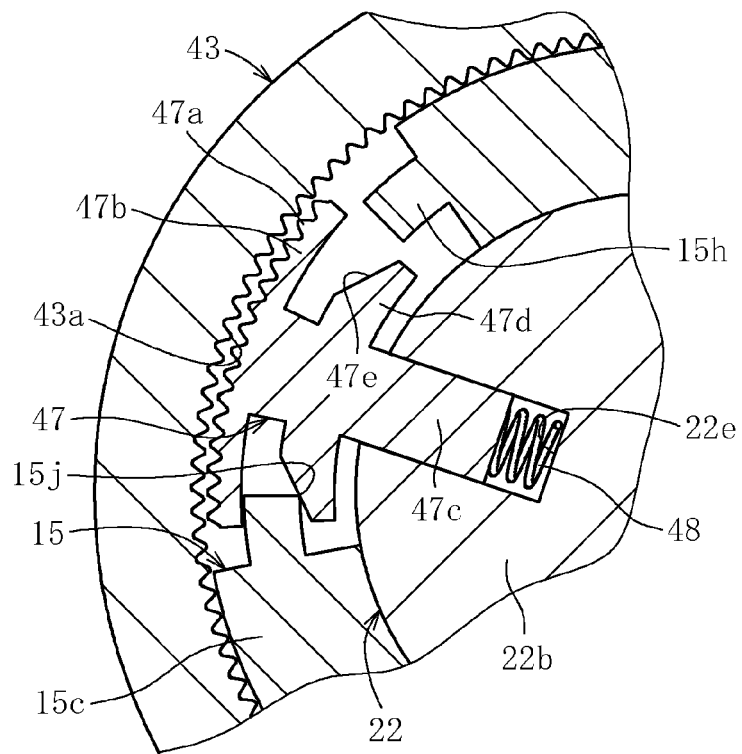
FIG. 22 is an enlarged main part sectional view illustrating a modification example of an arm portion of an inner ring.
Figure 23:
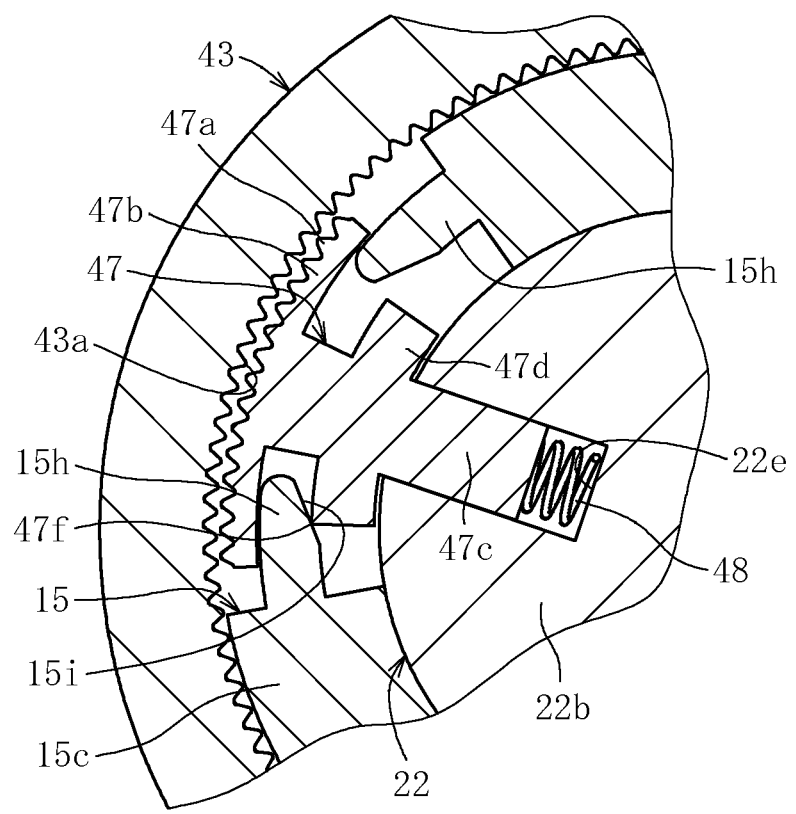
FIG. 23 is an enlarged main part sectional view illustrating a modification example of an arm portion of an engagement element.

The above description is directed to the case where the tapered surfaces 15i and 47e are formed both on the inner peripheral surfaces of the arm portions 15h of the inner ring 15 and on the outer peripheral surfaces of the arm portions 47d of the engagement elements 47. However, the present invention is not limited thereto. As illustrated in FIG. 22, there may be employed such a structure that the tapered surfaces 47e are formed only on the outer peripheral surfaces of the arm portions 47d of the engagement elements 47 and angled portions 15j are formed on the inner peripheral surfaces of the arm portions 15h of the inner ring 15. Alternatively, as illustrated in FIG. 23, there may be employed such a structure that the tapered surfaces 15i are formed only on the inner peripheral surfaces of the arm portions 15h of the inner ring 15 and angled portions 47f are formed on the outer peripheral surfaces of the arm portions 47d of the engagement elements 47. Due to such a structure that the cam portions 49 have the tapered surfaces 47e of the engagement elements 47 or the tapered surfaces 15i of the inner ring 15, the engagement elements 47 are easily shifted in the direction of disengaging the engagement elements 47 from the brake-side outer ring 43 against the elastic forces of the coil springs 48.

Figure 24:
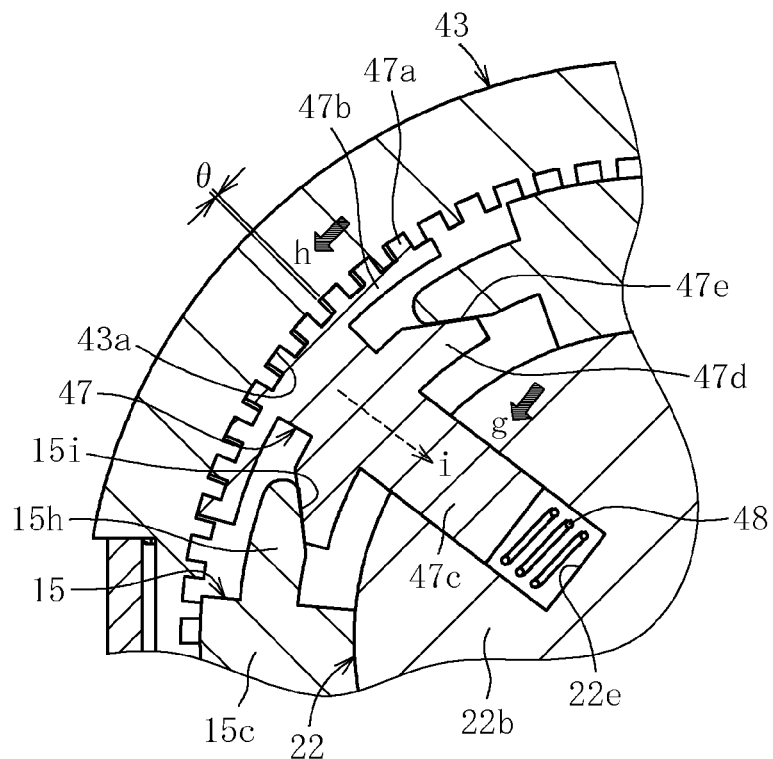
FIG. 24 is an enlarged main part sectional view illustrating a modification example of projection and depression portions.

Further, as illustrated in FIG. 24, the projection and depression portions 43a and 47a may each have a rectangular shape instead of the angular shape. Due to such a structure that the projection and depression portions 43a and 47a each have the rectangular shape, when the rotational torque is reversely input from the output shaft 22 and applied to the brake-side outer ring 43 via the engagement elements 47 (see the arrows "g" and "h" of FIG. 24), no radial load is generated in the engagement elements 47 radially inward (see the broken line arrow "i" of FIG. 24). Thus, the meshing state of the projection and depression portions 43a and 47a is maintained reliably and easily. In this case, it is preferred that a gap "θ" between the projection and depression portion 43a of the brake-side outer ring 43 and the projection and depression portion 47a of each engagement element 47 be set to, for example, 1° or less. Note that, the projection and depression portions 43a and 47a may each have another shape such as a tooth-like shape (involute shape). When the shape of each of the projection and depression portions 43a and 47a is defined as described above, the projection and depression portions 43a and 47a can easily be meshed and unmeshed at the time of engagement and disengagement of the engagement elements 47 with and from the brake-side outer ring 43.

Figure 25:
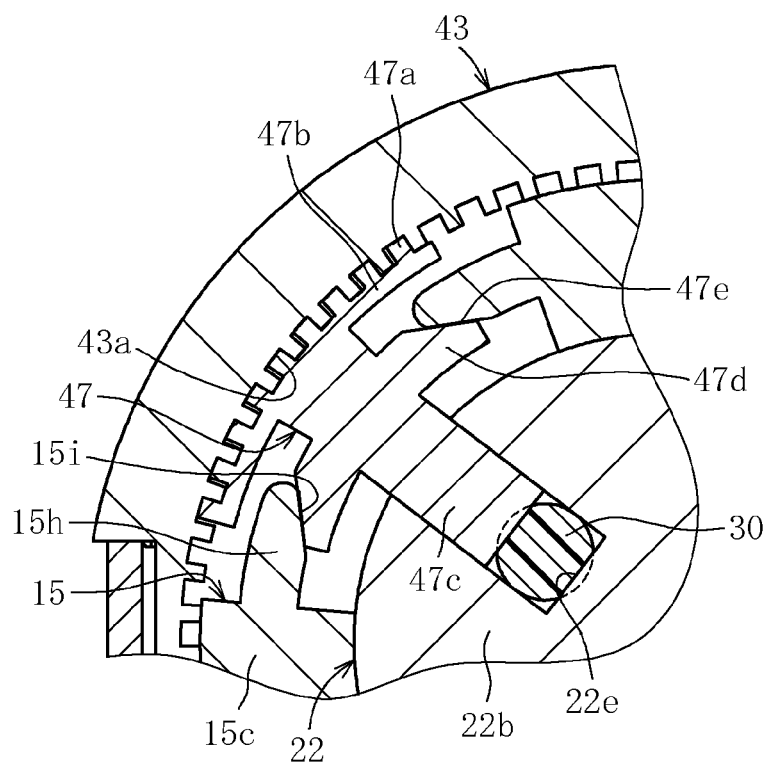
FIG. 25 is an enlarged main part sectional view illustrating a modification example of an elastic member.

Still further, the description is given of the coil springs 48 serving as the elastic members provided between the leg portions 47c of the engagement elements 47 and the depressed grooves 22e of the output shaft 22. However, the present invention is not limited thereto. As illustrated in FIG. 25, elastomers 30 may be employed as the elastic members. In this case, it is preferred that the elastomers 30 be accommodated between the leg portions 47c of the engagement elements 47 and the depressed grooves 22e of the output shaft 22 in a state of being compressed from a natural state (see the broken line of FIG. 25). With this structure, elastic forces of the elastomers 30 can reliably be applied to the engagement elements 47, and thus the meshing state of the projection and depression portions 43a and 47a is maintained reliably and easily. Due to such a structure that the elastic members comprise the coil springs 48 or the elastomers 30, the engagement elements 47 are easily biased elastically in the direction of engaging the engagement elements 47 with the brake-side outer ring 43.

Figure 26:
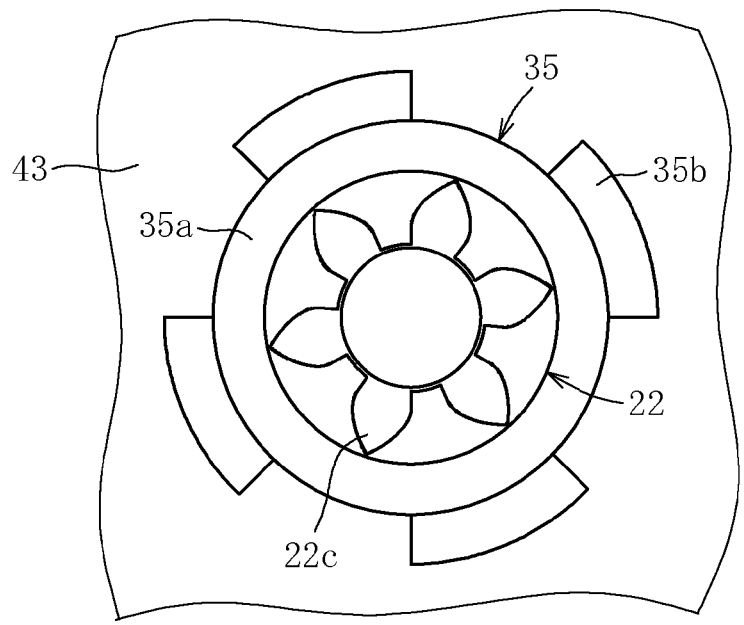
FIG. 26 is a main part side view illustrating an example of a friction ring as seen in the X direction of FIG. 19.

Note that, in the above-mentioned brake-side clutch section 12, as illustrated in FIG. 26 (as seen in the arrow X direction of FIG. 19), a friction ring 35 made of, for example, resin is interposed between the output shaft 22 and the brake-side outer ring 43. The friction ring 35 has such a structure that four rib portions 35b are formed on an outer periphery of an annular portion 35a. The friction ring 35 is press-fitted between the output shaft 22 and the brake-side outer ring 43 with a predetermined interference. Due to the rib portions 35b of the friction ring 35, rotation of the friction ring 35 with respect to the brake-side outer ring 43 is prevented. Further, due to a frictional force generated between an inner peripheral surface of the annular portion 35a and the outer peripheral surface of the output shaft 22, rotational resistance is imparted to the output shaft 22.

Figure 27:
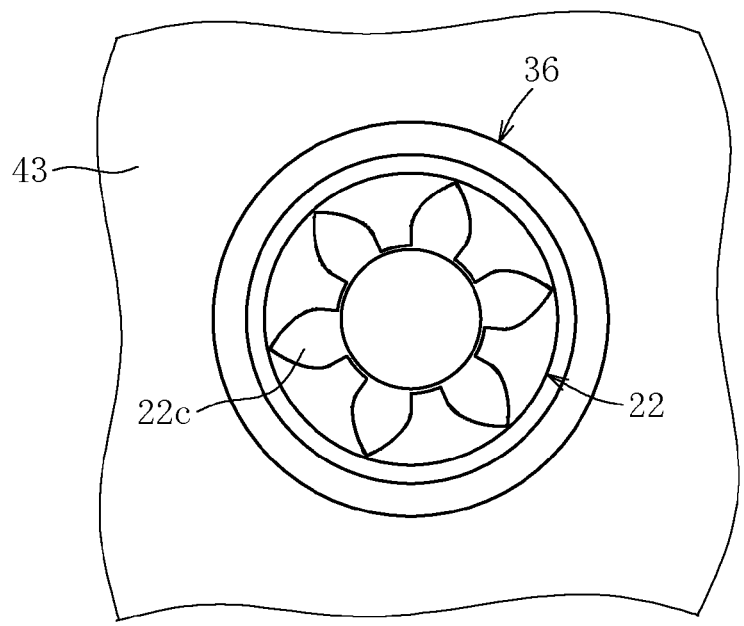
FIG. 27 is a main part side view illustrating another example of the friction ring.

Due to such a structure that the friction ring 35 imparts the rotational resistance to the output shaft 22, even in a case where the rotational torque is applied to the output shaft 22 in the same direction as that of the inner ring 15, it is possible to forestall a state in which the engagement elements 47 are shifted radially outward immediately after the engagement elements 47 are shifted radially inward and the projection and depression portions 43a and 47a are therefore unmeshed from each other, in other words, a looseness that may cause the output shaft 22 to repeat the locked state and the unlocked state. Note that, as illustrated in FIG. 27, a plain bearing may be employed as the friction ring 36. The plain bearing has different friction coefficients between an outer peripheral surface and an inner peripheral surface thereof, and hence the plain bearing may be employed as the friction ring 36.

Figure 28:
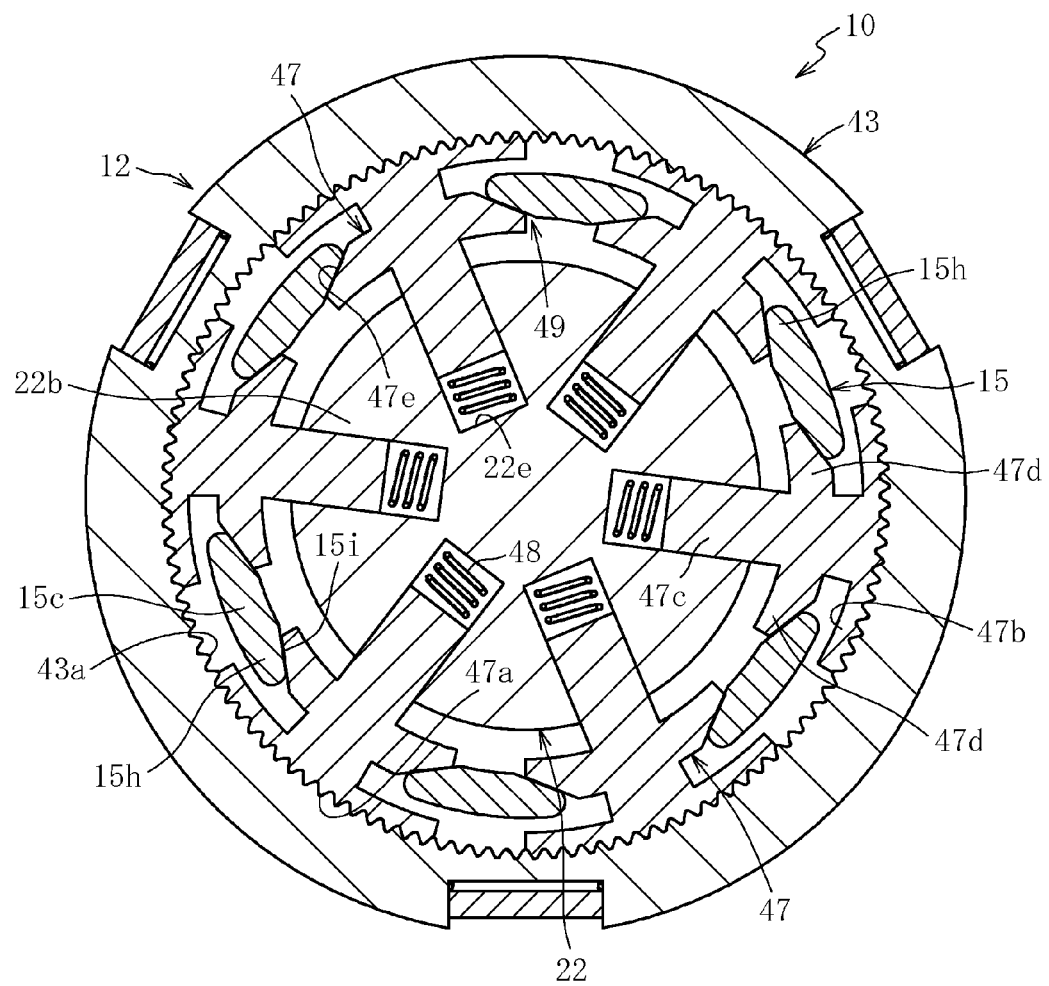
FIG. 28 is a sectional view illustrating a modification example of a brake-side clutch section of FIG. 20.

Further, the above description is directed to the case where the brake-side clutch section 12 comprises the three engagement elements 47. However, the present invention is not limited thereto. The number of the engagement elements 47 may be set arbitrarily, and as illustrated in FIG. 28, for example, six engagement elements 47 may be provided alternatively. In this case, the inner ring 15 also comprises six columnar portions 15c in accordance with the number of the engagement elements 47. The structures and operations of the engagement elements 47 and the inner ring 15 are similar to the case of the structures illustrated in FIG. 20, and redundant description is therefore omitted herein.

The clutch unit 10 having the structure as described above in detail is used while being built into, for example, an automobile seat-lifter section. FIG. 29 illustrates a seat 40 installed in a cabin of an automobile. The seat 40 comprises a sitting seat 40a, a backrest seat 40b, the seat-lifter section 41 for adjusting a height H of the sitting seat 40a, and the like. Adjustment of the height H of the sitting seat 40a is performed with an operation lever 41a of the seat-lifter section 41.

Figure 30:
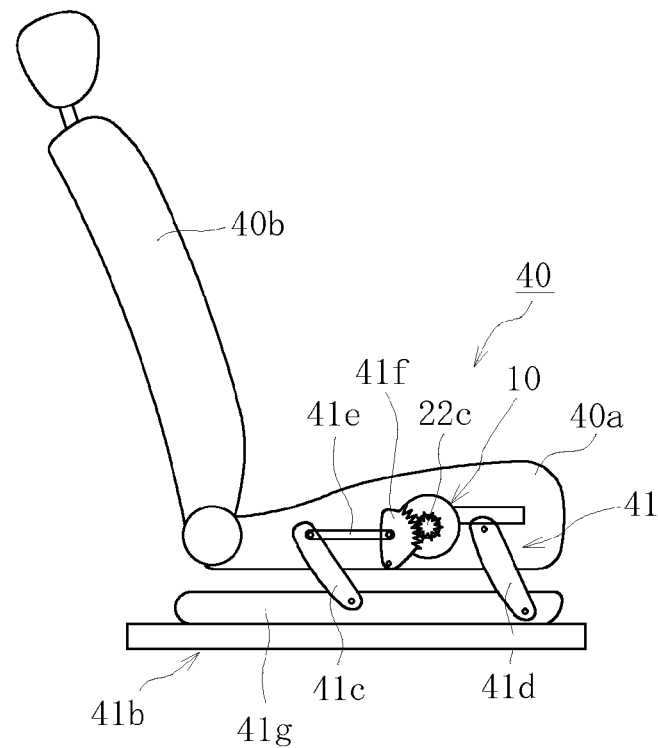
FIG. 30 is a schematic structural view illustrating a structural example of a seat-lifter section.

FIG. 30 is a conceptual view illustrating a structural example of the seat-lifter section 41. Ends of link members 41c and 41d on one side are pivotally mounted to a slide movable member 41g of a seat slide adjuster 41b. Ends of the link members 41c and 41d on the other side are pivotally mounted to the sitting seat 40a. The end of the link member 41c on the other side is pivotally mounted to a sector gear 41f through intermediation of a link member 41e. The sector gear 41f is pivotally mounted to the sitting seat 40a, and is pivotable about a fulcrum 41h. The end of the link member 41d on the other side is pivotally mounted to the sitting seat 40a.

Meanwhile, the operation lever 41a made of, for example, resin is coupled to the lever-side side plate 13 of the lever-side clutch section 11, and the pinion gear 22c meshing with the sector gear 41f serving as a rotary member is provided to the output shaft 22 of the brake-side clutch section 12. As illustrated in FIG. 1, the pinion gear 22c is integrally formed at a distal end of the shaft portion 22a of the output shaft 22.

Figure 31:
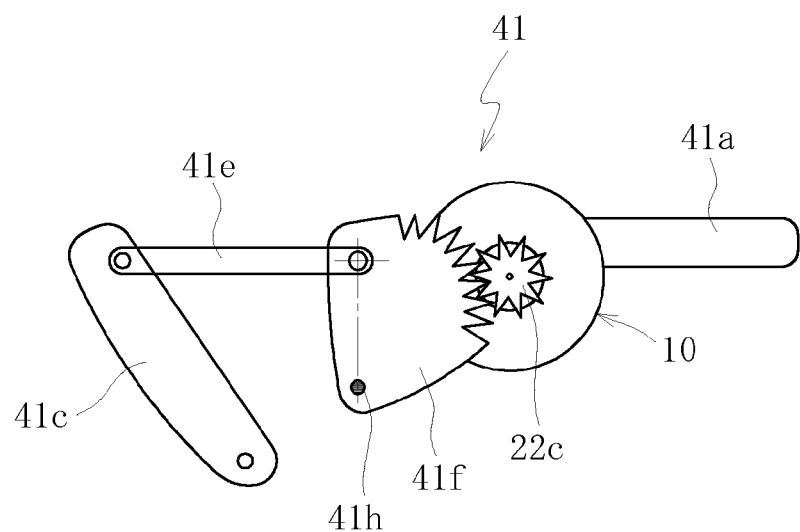
FIG. 31 is an enlarged main part view of FIG. 30.
Figure 32:
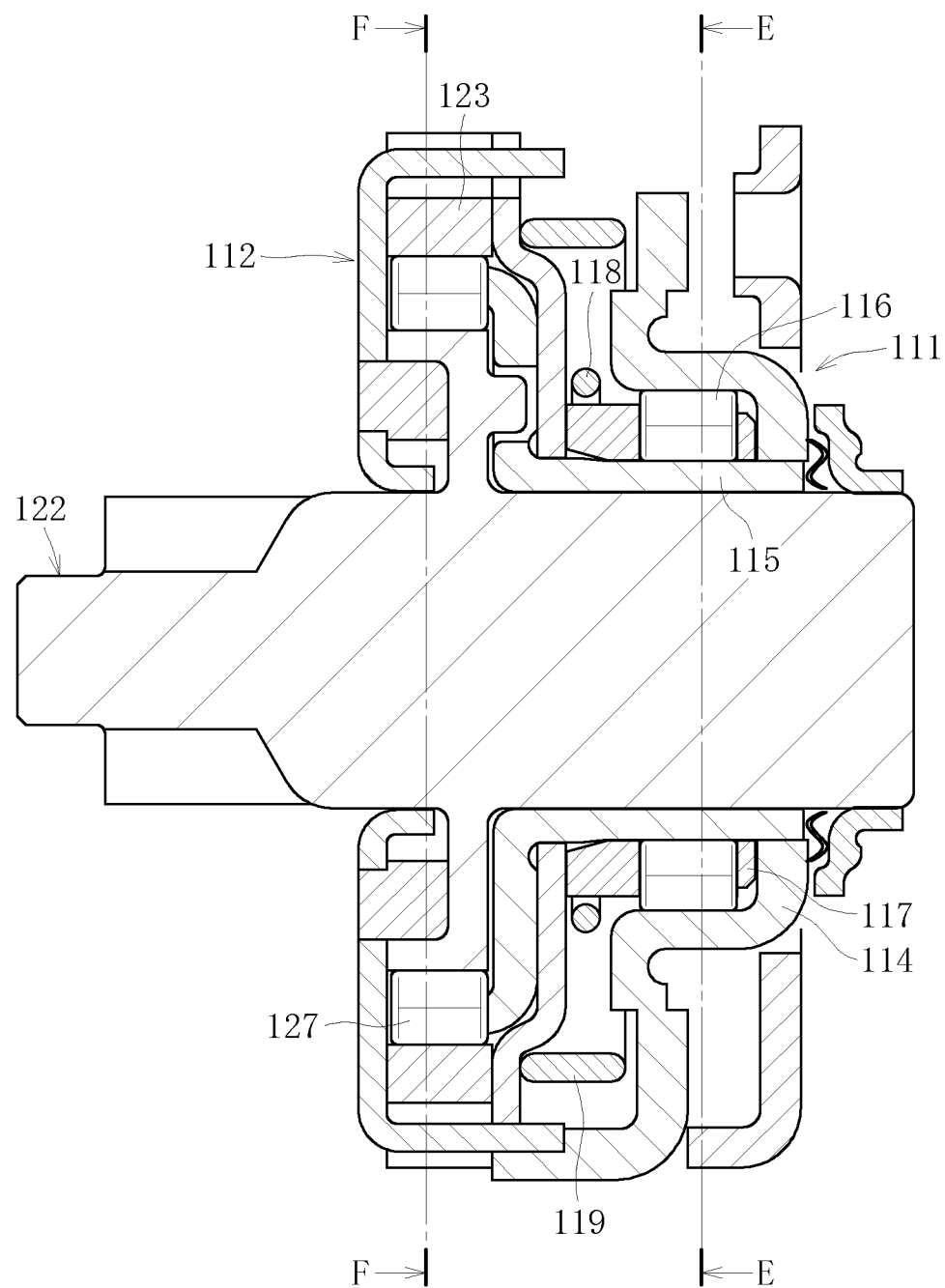
FIG. 32 is a sectional view illustrating an overall structure of a related-art clutch unit.
Figure 33:
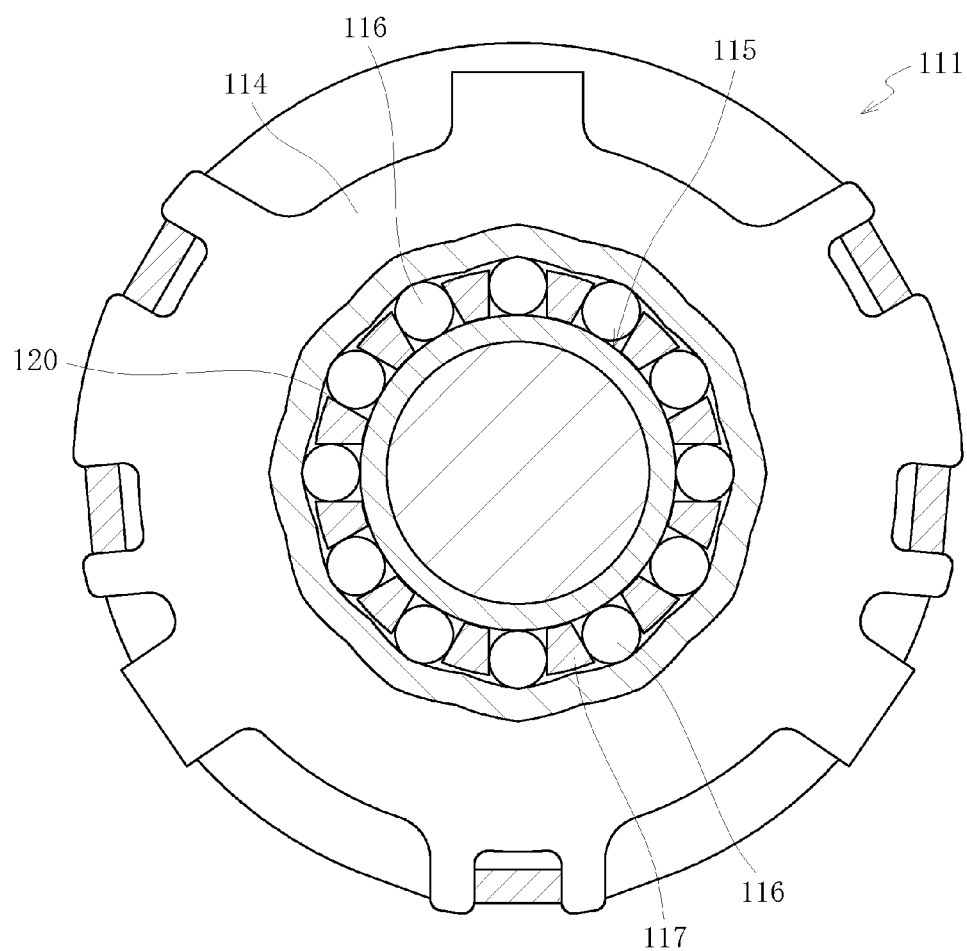
FIG. 33 is a sectional view taken along the line E-E of FIG. 32.
Figure 34:
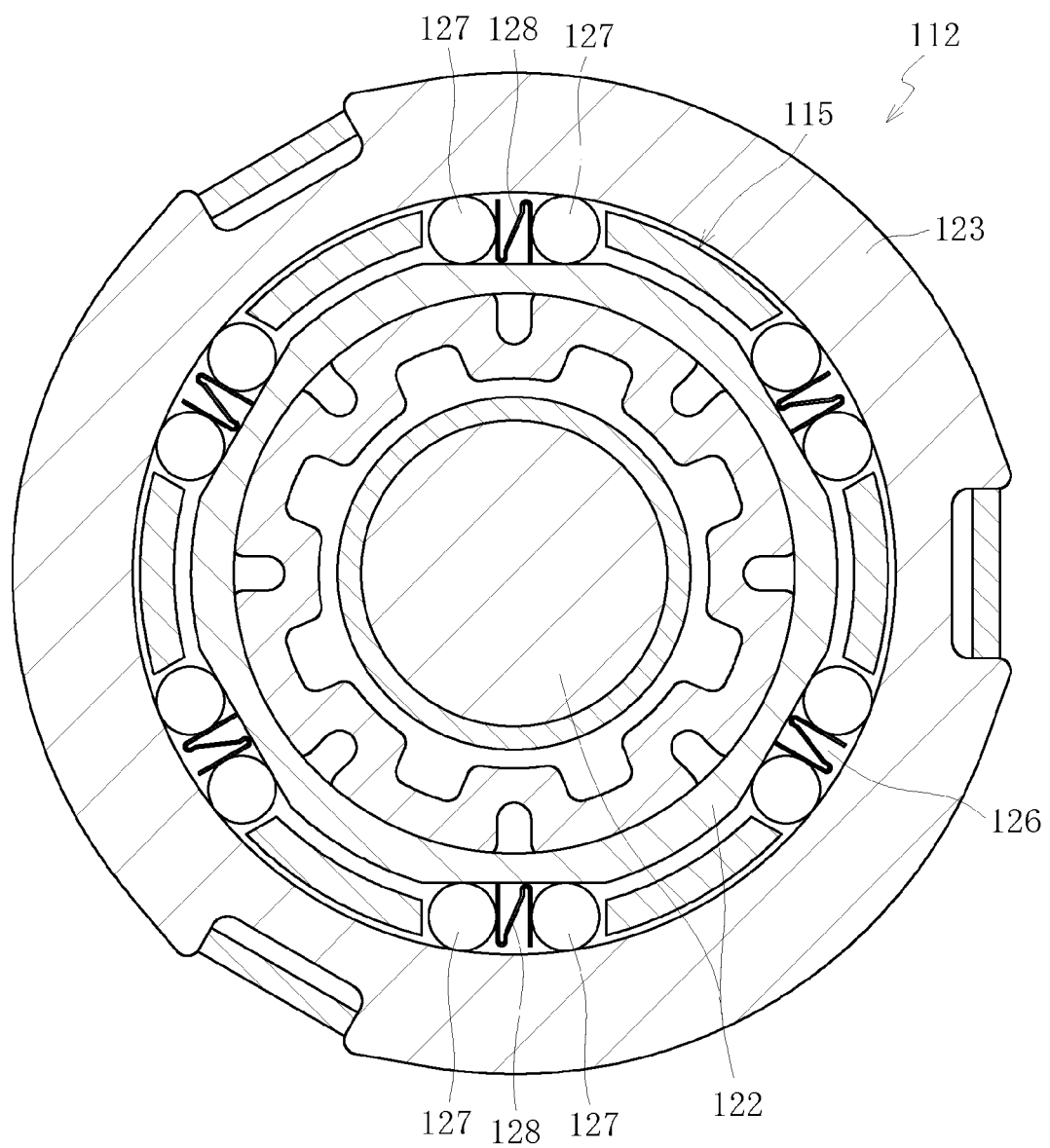
FIG. 34 is a sectional view taken along the line F-F of FIG. 32.

In FIG. 31, when the operation lever 41a is pivoted counterclockwise (upward), a torque input in that direction is transmitted to the pinion gear 22c through intermediation of the clutch unit 10 so that the pinion gear 22c pivots counterclockwise. Then, the sector gear 41f meshing with the pinion gear 22c pivots clockwise so as to pull the end of the link member 41c on the other side through intermediation of the link member 41e. As a result, the link member 41c and the link member 41d stand together, and a seat surface of the sitting seat 40a becomes higher.

In this manner, when the operation lever 41a is released after adjustment of the height H of the sitting seat 40a, the operation lever 41a pivots clockwise with the elastic forces of the two centering springs 18 and 19, and returns to the original position (restores to the neutral state). Note that, when the operation lever 41a is pivoted clockwise (downward), the seat surface of the sitting seat 40a is lowered through operation in an opposite direction to that in the case described above. Further, when the operation lever 41a is released after adjustment of the height, the operation lever 41a pivots counterclockwise and returns to the original position (restores to the neutral state).

The present invention is not limited to the above-mentioned embodiments. As a matter of course, the present invention may be further carried out in various modes without departing from the spirit of the present invention. The scope of the present invention is defined by claims, and encompasses the meaning of an equivalent of the claims and all the modifications within the claims.

The invention claimed is:

1. A clutch unit, comprising:
an input-side clutch section provided on an input side, for controlling transmission and interruption of a rotational torque to be input; and
an output-side clutch section provided on an output side, for transmitting the rotational torque from the input-side clutch section to the output side, and interrupting a rotational torque to be reversely input from the output side,
the output-side clutch section comprising:
an input member to which the rotational torque is to be input;
a stationary member restricted in rotation;
an output member from which the rotational torque is to be output;
an engagement element arranged between the stationary member and the output member, for interrupting the rotational torque from the output member through engagement between the stationary member and the output member, and transmitting the rotational torque from the input member through disengagement between the stationary member and the output member; and
control means for engaging, at the time of interrupting the rotational torque, the engagement element between the stationary member and the output member through meshing of projection and depression portions of the engagement element and the stationary member, and disengaging, at the time of transmitting the rotational torque, the engagement element between the stationary member and the output member through unmeshing of the projection and depression portions.

2. The clutch unit according to claim 1, wherein the control means comprises:
an elastic member provided between the engagement element and the output member, for elastically biasing the engagement element in a direction of engaging the engagement element with the stationary member through the meshing of the projection and depression portions; and
a cam portion provided between the engagement element and the input member, for shifting, against an elastic force of the elastic member, the engagement element in a direction of disengaging the engagement element from the stationary member through the unmeshing of the projection and depression portions.

3. The clutch unit according to claim 2, wherein the cam portion has a tapered surface formed on at least one of the engagement element or the input member.

4. The clutch unit according to claim 1, wherein the engagement element is engageable and disengageable between the stationary member and the output member by shifting in a radial direction of the clutch unit.

5. The clutch unit according to claim 1, wherein the projection and depression portions each have any one shape selected from among an angular shape, a rectangular shape, or a tooth-like shape.

6. The clutch unit according to claim 1, wherein the output-side clutch section further comprises a two-way clutch comprising two types of one-way clutches each configured to transmit a rotational torque in a forward direction and a rotational torque in a backward direction from the input-side clutch section to the output side, only one type of one-way clutch out of the two types of one-way clutches being configured to interrupt any one of the rotational torque in the forward direction and the rotational torque in the backward direction, which are to be reversely input from the output side, through the meshing of the projection and depression portions.

7. The clutch unit according to claim 6,
wherein the two-way clutch is structured so that a stationary member of the one type of one-way clutch and a stationary member of another type of one-way clutch are arranged in abutment on each other,
wherein the stationary member of the one type of one-way clutch has an abutment surface with a protrusion and a hole formed therein,
wherein the stationary member of the another type of one-way clutch has an abutment surface with a protrusion and a hole formed therein,
wherein the protrusion of the stationary member of the one type of one-way clutch is fitted into the hole of the stationary member of the another type of one-way clutch under a state in which directions of interrupting the rotational torque through the meshing of the projection and depression portions are opposite to each other, and
wherein the protrusion of the stationary member of the another type of one-way clutch is fitted into the hole of the stationary member of the one type of one-way clutch under the state in which the directions of interrupting the rotational torque through the meshing of the projection and depression portions are opposite to each other.

8. The clutch unit according to claim 6, wherein, when disengaging an engagement element of the one type of one-way clutch from a stationary member thereof, the two-way clutch maintains a non-contact state between an input member and an engagement element of the another type of one-way clutch before an input member of the one type of one-way clutch is brought into contact with the engagement element thereof.

9. The clutch unit according to claim 6,
wherein the input member and the output member are each shared by the two types of one-way clutches serving as the two-way clutch, and
wherein an engagement element of the one type of one-way clutch and an engagement element of another type of one-way clutch are arranged in a reverse relationship with respect to their center lines extending in a radial direction of the clutch unit.

10. The clutch unit according to claim 6, wherein the control means comprises an elastic member, the elastic member being shared by the one type of one-way clutch and another type of one-way clutch out of the two types of one-way clutches serving as the two-way clutch.

11. The clutch unit according to claim 6, wherein the two-way clutch comprises chamfers formed at any one pair of edge portions of an engagement element of the one type of one-way clutch and an engagement element of another type of one-way clutch, which are arranged side by side in an axial direction of the clutch unit and held in abutment on a stationary member of the one type of one-way clutch and a stationary member of the another type of one-way clutch, respectively, or edge portions of the stationary member of the one type of one-way clutch and the stationary member of the another type of one-way clutch, which are held in abutment on the engagement element of the one type of one-way clutch and the engagement element of the another type of one-way clutch, respectively.

12. The clutch unit according to claim 1, wherein the input-side clutch section and the output-side clutch section are built into an automobile seat-lifter section.

* * * * *